3,379,731
1,4-DIHYDRO-1,4-ETHANO-ISOQUINOLINES
Gordon Northrop Walker, Mount Kemble Lake, N.J., assignor to Ciba Corporation, New York, N.Y., a corporation of Delaware
No Drawing. Continuation-in-part of application Ser. No. 388,690, Aug. 10, 1964. This application June 15, 1967, Ser. No. 646,181
17 Claims. (Cl. 260—286)

ABSTRACT OF THE DISCLOSURE 1,4-dihydro-1,4-ethano-isoquinolinium salts of the formula

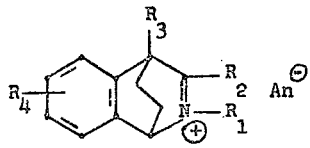

$R_{1,2}$=aliphatic or araliphatic radical
$R_3$=H, aliphatic, araliphatic or aromatic radical
$R_4$=H, alkyl, alkoxy, halogeno, $CF_3$ or amino
$An^\ominus$=anion of an acid exhibit diuretic, natri- and chloriuretic effects.

CROSS-REFERENCES TO RELATED APPLICATIONS

This is a continuation-in-part of application Ser. No. 388,690, filed Aug. 10, 1964, which in turn is a continuation-in-part of application Ser. No. 357,778, filed Apr. 6, 1964, which in turn is a continuation-in-part of application Ser. No. 314,517, filed Oct. 7, 1963 (now abandoned).

SUMMARY OF THE INVENTION

The present invention concerns and has for its object the provision of new 1,4-dihydro-1,4-ethano-isoquinolinium salts, more particularly those of the Formula I

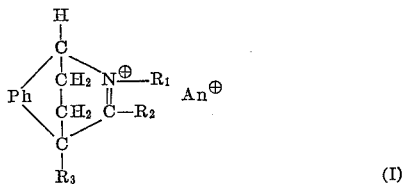

in which each of $R_1$ and $R_2$ stands for an aliphatic or araliphatic radical, $R_3$ for hydrogen, an aliphatic, araliphatic or aromatic radical and Ph for an unsubstituted or substituted 1,2-phenylene radical, the latter is preferably such containing lower alkyl, lower alkoxy, halogeno, trifluoromethyl and/or amino groups, and $An^\ominus$ for the anion of an acid, as well as corresponding pharmaceutical compositions and methods for the preparation of the new compounds. Said compositions are diuretic, natri- and chloriuretic agents lacking kaliuresis, advantageously useful in the treatment of edema due to heart failure or kidney conditions.

DESCRIPTION OF THE PREFERRED EMBODIMENTS

The aliphatic radicals $R_1$, $R_2$ and/or $R_3$ represent, for example, alkyl, preferably such with up to 12 carbon atoms and at most a tertiary carbon atom, such as methyl, ethyl, n-propyl, isopropyl, n-butyl, isobutyl, n-pentyl, n-hexyl, n-heptyl, n-octyl, n-nonyl, n-decyl, n-undecyl or n-dodecyl, lower alkenyl, such as allyl or methallyl, cycloalkyl or cycloalkyl-lower alkyl having from 3 to 8, preferably from 5 to 6, ring-carbon atoms, such as cyclopropyl, cyclopentyl, cyclohexyl or cycloheptyl; cyclopropylmethyl, 1 - cyclopropylethyl, cyclopentylmethyl, 3-cyclopentylpropyl, cyclohexylmethyl, 2-cyclohexylethyl or cycloheptylmethyl, cycloalkenyl or cycloalkenyl - lower alkyl having from 5 to 8, preferably from 5 to 6 ring-carbon atoms, such as 2-cyclopentenyl, 1-cyclohexenyl, 3-cyclohexenyl, 1-cycloheptenyl, 3-cycloheptenyl, or 1-cyclooctenyl; 1 - cyclopentenylmethyl, 2 - cyclohexenylmethyl or 2-(3-cyclohexenyl)-ethyl. The definition "lower" used above and hereinafter in connection with aliphatic or araliphatic radicals, is drawn to those with up to 7 chain-carbon atoms.

An araliphatic radical $R_1$, $R_2$ and/or $R_3$ is, for example, mono- or bicyclic carbocyclic aryl-lower alkyl, such as $R_4$-phenyl- or ($R_4$-naphthyl-1- or 2)-lower alkyl, e.g. benzyl, 1- or 2-phenylethyl, 1- or 2-naphthylmethyl; or heterocyclic aryl-lower alkyl, preferably monocyclic azacyclic aryl-lower alkyl, such as pyridyl-lower alkyl, e.g. 2- or 4-pyridylmethyl.

An aromatic radical $R_3$ is preferably monocyclic carbocyclic aryl, such as $(R_4)_n$-phenyl, and the 1,2-phenylene radical Ph preferably stands for $(R_4)_n$-1,2-phenylene in which $n$ is the integer 1 or 2.

The radical $R_4$ present in the above-phenyl or phenylene moieties, represents hydrogen, lower alkyl, such as that mentioned above, lower alkoxy, such as methoxy, ethoxy, n- or i-propoxy or -butoxy, halogeno, such as fluoro, chloro or bromo, trifluoromethyl or amino, preferably di-lower alkylamino, such as dimethylamino or diethylamino.

The above aliphatic, especially lower-alky radicals, may also contain one or more than one of the same or different substituents attached to any position available in the aliphatic moiety, for example, free, etherified or esterified hydroxy, such as lower alkoxy or halogeno, e.g. that mentioned above, di-lower alkylamino or lower alkyleneimino, e.g. dimethylamino, diethylamino, pyrrolidino, piperidino or hexyleneimino, trifluoromethyl, carboxy or preferably carbo-lower alkoxy, e.g. carbomethoxy or carbethoxy.

The compounds of the invention exhibit valuable pharmacological properties. They show primarily diuretic, natri- and chloriuretic activity and do not cause kaliuresis, which usually accompanies the diuretic, natri- and chloriuretic properties of known diuretic compounds. Said activity can be demonstrated in animal tests using for example mammals, such as rats or dogs, as test objects. Besides their above-mentioned utility, the compounds of the invention are also valuable intermediates in the preparation of other useful products, particularly of pharmacologically active compounds. For example, the compounds of copending application Ser. No 634,891, filed May 1, 1967, can be obtained from the compounds of this invention by hydrogenation.

Preferred compounds of the present invention are those of Formula I, in which each of $R_1$ and $R_2$ stands for lower alkyl or $R_4$-phenyl-lower alkyl, $R_3$ for hydrogen, lower alkyl, $R_5$-phenyl-lower alkyl or $R_5$-phenyl, Ph for $(R_5)_n$-1,2-phenylene and each of $R_4$, $R_5$ and $R_6$ for hydrogen, lower alkyl, lower alkoxy, halogeno, trifluoromethyl or di-lower alkylamino and $n$ for the integer 1 or 2, in which compounds lower alkyl and lower alkoxy contain at most, one tertiary carbon atom, and $An^{\ominus}$ stands for the anion of a therapeutically useful acid.

Particularly useful are compounds of the Formula II

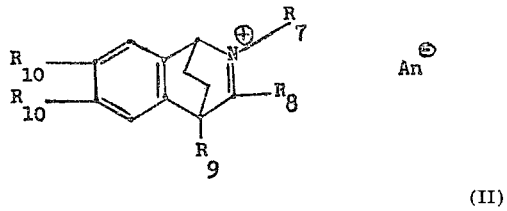

(II)

in which $R_7$ stands for methyl, ethyl, n-propyl, n-butyl, allyl, benzyl, 2-phenylethyl or carbethoxy-methyl, $R_8$ for methyl, ethyl, n-propyl or n-butyl, $R_9$ for hydrogen, methyl, ethyl, 3-hydroxy-3-methylbutyl, cyclopentyl, cyclohexylmethyl, benzyl, phenyl or 4-fluorophenyl and $R_{10}$ for hydrogen or methoxy, and $An^{\ominus}$ for the anion of a therapeutically useful acid which, when given orally to dogs at doses between about 1 and 10 mg./kg./day, or to rats at doses between about 5 and 75 mg./kg./day, show outstanding diuretic, natri- an dchloriuretic effects.

The compounds of the invention are advantageously prepared by—

(a) quaternizing a corresponding 2-unsubstituted 1,4-dihydro-1,4-ethano-isoquinoline with a reactive ester of the alcohol $R_1$—OH, or (b) isomerizing a corresponding 3-alkylidene or aralkylidene-1,2,3,4-tetrahydro-1,4-ethano-isoquinoline with an acid or a reactive ester of a sterically hindered alcohol, or (c) oxidizing a corresponding 2-substituted 1,2,3,4-tetrahydro-1,4-ethano-isoquinoline salt and, if desired, converting any resulting compound into another compound of the invention.

The reactive ester used in reaction (a) is preferably such of an inorganic acid, for example a hydrohalic acid, e.g. hydrochloric, hydrobromic or hydroiodic acid, of sulfuric acid or of a strong sulfonic acid, e.g. methane-, ethane-, 2-hydroxyethane-, benzene-, 4-bromobenzene- or p-toluenesulfonic acid. The acid used in reaction (b) is preferably a mineral acid advantageously a hydrohalic acid, e.g. hydrochloric or hydrobromic acid, which may be used in its gaseous form. The reactive ester of a sterically hindered alcohol is particularly that of a strong inorganic acid, e.g. one of the above-described hydrohalic, sulfuric or sulfonic acids. The sterically hindered alcohol moiety is derived either from a primary, secondary or tertiary higher alkanol, a cycloalkanol or particularly of an araliphatic alcohol such as a phenyl-lower alkanol, e.g. benzyl alcohol. Particularly useful esters are higher alkyl, cycloalkyl or aryl-lower alkyl halides or sulfonates. The oxidation according to reaction (c) is advantageously carried out with an oxidation agent containing a polyvalent metal, such as mercury, lead or chromium, more particularly with mercuric acetate, lead tetraacetate, chromium trioxide or potassium dichromate.

In the compounds of the invention so obtained, the anion $An^{\ominus}$ is preferably such of a therapeutically useful acid for example a mineral acid such as a hydrohalic, e.g. hydrochloric or hydrobromic acid, sulfuric, phosphoric, nitric or perchloric acid or an aromatic carboxylic or sulfonic acid, e.g. formic, acetic, propionic, succinic, gluconic, lactic, malic, tartaric, citric, ascorbic, maleic, hydroxymaleic, pyroracemic, phenylacetic, benzoic, 4-aminobenzoic, anthranilic, hydroxybenzoic, salicylic, aminosalicylic, embonic, nicotinic, isonicotinic, methanesulfonic, ethanesulfonic, 1,2-ethanedisulfonic, 2-hydroxyethanesulfonic, benzenesulfonic, toluenesulfonic, 2-naphthalenesulfonic or sulfanilic acid. Said anion may also be derived of an acid useful for identification or characterization purposes, such as of an acidic organic nitro compound or a metal complex acid, e.g. picric, picrolonic, flavianic, phosphotungstic, phosphomolybdic, chloroplatinic or Reinecke acid.

The compounds of the invention so obtained may be converted into each other according to known methods. For example, in a resulting quaternary salt the anion may be replaced by another anion, for example with the use of an ion exchange preparation, the treatment of a resulting halide with silver oxide, a resulting sulfate with barium hydroxide and the like and conversion of the resulting base into its salt, for example by reaction with an acid or an ion exchange preparation. Furthermore, the anion of a resulting salt may be converted directly into another anion, for example by treatment with a suitable anion exchange preparation, e.g. such as described in U.S. Patent No. 2,591,573 or a resulting iodide may be reacted with freshly prepared silver chloride or methanolic hydrogen chloride.

The above reactions are carried out according to standard methods, in the presence or absence of diluents, preferably such as are inert to the reagents and are solvents thereof, of catalysts, condensing agents and/or inert atmospheres, at low temperatures, room temperature or advantageously elevated temperatures, at atmospheric or superatmospheric pressure. For example in reaction (b) the ester of the sterically hindered alcohol is used in the presence of a proton source, which is usually furnished by the solvent, e.g. an alcohol and/or water.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the process of the invention that lead to the formation of those compounds indicated above as being specially valuable.

The starting material used in reaction (c) is described in the above-mentioned co-pending application Ser. No. 634,891 and can be prepared by hydrolyzing a 4-phenyl-4-$R_3$-4-$R_2$-carbonylbutyronitrile and condensing the resulting acid, advantageously under the reaction conditions, i.e. in the presence of sulfuric acid, to the 4-$R_2$-carbonyl-4 - $R_3$-1,2,3,4-tetrahydro-naphthalene-1-one. The latter is reacted either under mild or vigorous conditions with hydroxylamine in order to obtain the mono- or bisoxime thereof, which is then reductively condensed, preferably with the use of catalytically activated or nascent hydrogen, for example, hydrogen in the presence of platinum, palladium or nickel catalysts, e.g. palladium on charcoal, platinum black or Raney nickel, or electrolytically generated hydrogen. The starting material used in reaction (a) is analogously prepared, however under less drastic reductive conditions. The starting material used in reaction (b) can be prepared either by reductively condensing the oxime of a 1-$R_2$-4-oxo-1,2,3,4-tetrahydro-naphthalene-carboxylic acid ester or according to the process of U.S. Patent No. 3,324,136 by reacting a 1-$R_2$-1,2,3,4-tetrahydro - 4 - oxo-naphthalene-carboxylic acid amide or nitrile with a mixture of an unsubstituted or N-substituted formamide, ammonium formiate and formic acid. The resulting 1,2,3,4 - tetrahydro - 1,4-ethano-isoquinoline-3-one is then reacted with an $R_2$-organometallic reagents, such as $R_2$-lithium or an $R_2$-Grignard reagent under dehydrating conditions or reacted with a corresponding $R_2$-Wittig reagent.

The compounds of the invention can be used, for example, for the manufacture of pharmaceutical compositions containing them in conjunction or admixture with inorganic or organic, solid or liquid pharmaceutical excipients, sutiable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

Example 1

A mixture of 7.5 g. of 3-methyl-4-phenyl-1,4-dihydro-1,4-ethano-isoquinoline and 25 ml. of methyl iodide in 150 ml. of methanol is refluxed for 5½ hours. The major portion of the solvent is evaporated, whereupon a crystalline product is formed which is filtered off and washed with methanol to yield 9.25 g. of the 2,3-dimethyl-4-phenyl-1,4-dihydro-1,4-ethano-isoquinolinium iodide of the formula

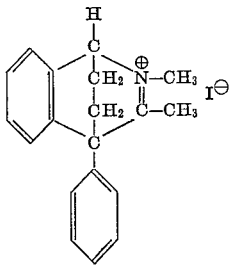

which melts at 242–244° (with decomposition) after recrystallization from methanol and contains one mole of water. It analyzes as follows: Calcd. for $C_{19}H_{20}NI \cdot H_2O$: C, 56.02; H, 5.45; N, 3.42; I, 31.16. Found: C, 55.65; H, 5.35; N, 3.14; I, 32.32. The infrared absorption spectrum (taken in mineral oil) shows the presence of water and a strong peak at 6.03μ.

Another sample, melting at 233–234° (with decomposition), obtained by recrystallizing the resulting 2,3-dimethyl-4-phenyl-1,4-dihydro-1,4 - ethano - isoquinolinium iodide from a mixture of methanol and diethyl ether, does no longer show the broad hydroxyl band in the infrared absorption spectrum. It analyzes as follows: Calcd. for $C_{19}H_{20}NI$: C, 58.62; H, 5.18; N, 3.60. Found: C, 57.58; H, 5.39; N, 4.15; and represents the anhydrous 2,3-dimethyl - 4 - phenyl-1,4-dihydro-1,4-ethano-isoquinolinium iodide.

The starting material is prepared as follows: To the mixture of 105.0 g. 1,1-diphenylacetone, 300 ml. tetrahydrofuran and 15 ml. of a 40% solution of benzyl trimethylammonium methoxide in methanol, 26.5 g. acrylonitrile in 100 ml. tetrahydrofuran are added during 20 minutes at 25–30°. It is allowed to stand at room temperature for 1½ hours, then chilled, acidified with diluted hydrochloric acid and poured onto ice. The precipitate is filtered off and washed with water. It is triturated with diethyl ether to yield the 4-acetyl-4,4-diphenyl-butyronitrile, which melts after recrystallization from ethanol at 117–118°. The mixture of 130.0 g. thereof, 800 ml. glacial acetic acid and 800 ml. concentrated hydrochloric acid is refluxed for 4½ hours. It is concentrated, cooled, poured into 3 liters ice water, the precipitate collected, washed with water and recrystallized from ethanol to yield the 4-acetyl-4,4-diphenyl-butyric acid, M.P. 142.5°.

95.0 g. thereof are added in small portions to 800 ml. concentrated sulfuric acid while stirring. The addition is completed after 1½ hours; occasional external cooling is necessary to prevent the temperature rise above 30–40°. The deep-red solution is stirred at room temperature for another four to five hours and is then poured onto about 4000 g. chopped ice. The organic material is extracted with diethyl ether, the extract washed with water, aqueous sodium hydroxide and again with water, dried and evaporated to yield the crystalline 4-acetyl-4-phenyl-1,2,3,4-tetrahydro-naphthalene-1-one melting after recrystallization from diethyl ether at 106–108°.

The solution of 2.0 g. thereof and 5.0 g. hydroxylamine hydrochloride in 20 ml. water, 40 ml. ethanol and 10 ml. 20% aqueous sodium hydroxide, is refluxed for ten minutes, and then chilled in an ice bath. A small amount of ice is added whereupon a crystalline material separates. It is collected, washed with water and recrystallized from ethanol to yield the 4-acetyl-1-hydroxy-imino-4-phenyl-1,2,3,4-tetrahydro-naphthalene melting at 171–172°.

The solution of 2.8 g. thereof in 300 ml. ethanol is hydrogenated at about 3½ atmospheres in the presence of 1.0 g. 10% palladium on charcoal while heating to 60° and shaking. After three hours, the pressure has dropped about 0.1 atmosphere and the mixture is filtered. The filtrate is evaporated, the residue triturated with diethyl ether and recrystallized from ethanol-diethyl ether to yield the 3-methyl-4-phenyl-1,4-dihydro-1,4-ethano-isoquinoline melting at 135–136° after drying under reduced pressure.

Example 2

To a solution of 1.5 g. of 2,3-dimethyl-4-phenyl-1,4-dihydro-1,4-ethano-isoquinolinium iodide in 250 ml. of methanol is added silver chloride, freshly prepared from 5.0 g. of silver nitrate by precipitation with sodium chloride. The reaction mixture is refluxed and stirred for 4½ hours and is then filtered hot. The filtrate is evaporated, and the residue is recrystallized from a mixture of methanol and diethyl ether to yield 1.2 g. of 2,3-dimethyl-4-phenyl-1,4-dihydro-1,4-ethano - isoquinolinium chloride of the formula

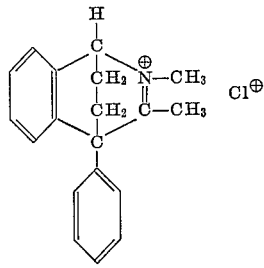

which melts at the sesquihydrate at 231–232° (with decomposition) after further recrystallizations from methanol.

Example 3

To the suspension of 13.15 g. 2-methyl-4-phenyl-1,2,3,4-tetrahydro-1,4-ethano-isoquinoline-3-one in 150 ml. toluene, 30 ml. of a 2.04 N solution of methyl lithium in hexane are added dropwise during 15 minutes while stirring, followed by 45 ml. toluene. The mixture is stirred at 70–75° for 1 hour, cooled and 2 ml. methanol are added followed by 50 ml. water. The aqueous layer is separated, the organic solution washed with water until neutral, dried, filtered and evaporated in vacuo below 45°. The residue is suspended in 60 ml. isopropanol and 4 ml. concentrated hydrochloric acid are added. After chilling the product is filtered off, washed with isopropanol and recrystallized from 90% aqueous acetone to yield the 2,3-dimethyl - 4 - phenyl - 1,2,3,4 - tetrahydro-1,4-ethano-isoquinolinium chloride melting at 241–243° with decomposition.

The starting material is prepared as follows: To the suspension of 500 g. diphenyl-acetonitrile in 500 ml. toluene, 28 ml. of an ethanolic solution of tetraethylammonium hydroxide are added, followed by 300 ml. methyl acrylate, allowing the temperature to rise to 80°. After the addition of 4 ml. of said tetraethyl-ammonium hydroxide solution, the mixture is refluxed for 2 hours and evaporated in vacuo. The residue is taken up in 2 liters 10% aqueous sodium hydroxide and the mixture refluxed for 1½ hours. After cooling it is slowly added to the stirred mixture of 750 ml. concentrated hydrochloric acid, 750 ml. water and 250 ml. isopropanol. The precipitate formed is filtered off, washed with water, dried in vacuo at 75° for 4 hours and recrystallized from isopropanol with the aid of charcoal to yield the δ-cyano-δ-diphenyl butyric acid melting at 162–165°.

The mixture of 232 g. thereof, 300 ml. benzene and 110 ml. thionyl chloride is refluxed for 2 hours and then evaporated in vacuo. To the residue 100 ml. benzene are added which are stripped again. The residue is dissolved in 150 ml. methylene chloride and the solution added during ½ an hour to the stirred suspension of 176 g. aluminum chloride in 400 ml. methylene chloride at a temperature not exceeding 15°. Hereupon the mixture is refluxed for 4 hours and cooled to room temperature. It is cautiously poured over 600 g. ice and 50 ml. concentrated hydrochloric acid, the organic solution separated, washed with 10% aqueous hydrochloric acid and 10% aqueous sodium hydroxide and water. It is dried, filtered, evaporated in vacuo and the residue recrystallized from isopropanol to yield the 4-phenyl-4-cyano-1,2,3,4-tetrahydronaphthalene-1-one, melting at 110–112°.

The mixture of 86.0 g. thereof, 430 ml. formamide (99%) and 103 ml. formic acid (90%) is refluxed for 24 hours and evaporated in vacuo. The residue is taken up in 250 ml. methanol, the solution refluxed for 1 hour and then chilled to 0°. The precipitate formed is filtered off and dried to yield the 4-phenyl-1,2,3,4-tetrahydro-1,4-ethano-isoquinoline-3-one melting at 256–262°.

To the suspension of 62 g. thereof in 248 ml. 1-methyl-2-pyrrolidone, 13.5 g. of a 55% suspension of sodium hydride in mineral oil is slowly added at room temperature while stirring. The mixture is then heated to 60° for 15 minutes, during which time dissolution occurs. It is cooled to 6° and the solution of 25 g. methyl chloride in 10 ml. 1-methyl-2-pyrrolidone is added slowly while stirring. The temperature is allowed to rise to 67° and after cooling, 60 g. more methyl chloride are added portionwise. The reaction mixture is stirred for 1½ hours at 27° and 1 hour at 60°. Hereupon 250 ml. water are added while cooling and, after stirring for 1 hour in an ice bath, the precipitate formed is filtered off, washed with water and triturated with acetone to yield the 2-methyl-4-phenyl-1,2,3,4-tetrahydro-1,4-ethano-isoquinoline-3-one melting at 196–198°.

Example 4

A mixture of 1.0 g. of 3-methyl-4-phenyl-1,4-dihydro-1,4-ethano-isoquinoline and 15 ml. of ethyl iodide in 100 ml. of ethanol is refluxed for seven hours. Upon evaporating the solvent and crystallizing the residue from diethyl ether and acetone, 0.7 g. of the 2-ethyl-3-methyl-4-phenyl-1,4-dihydro-1,4-ethano-isoquinolinium iodide of the formula

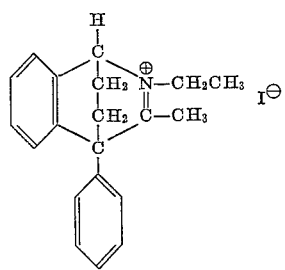

is obtained, which melts at 207–209° (with decomposition).

Example 5

A mixture of 1.0 g. of 3-methyl-4-phenyl-1,4-dihydro-1,4-ethano-isoquinoline and 15 ml. of n-butyl iodide and 100 ml. of ethanol is refluxed for 3½ hours and is then evaporated. The residue, when crystallized from diethyl ether and acetone, yields 1.3 g. of the 2-n-butyl-3-methyl-4-phenyl-1,4-dihydro-1,4-ethano-isoquinolinium iodide of the formula

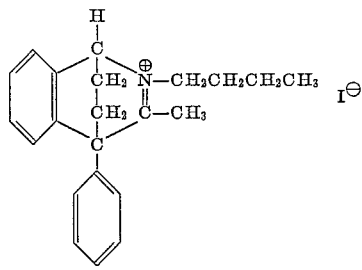

which melts at 210–212° (with decomposition) after recrystallization from acetone.

Example 6

A mixture of 1.0 g. of 3-methyl-4-phenyl-1,4-dihydro-1,4-ethano-isoquinoline and 15 ml. of benzyl chloride in 100 ml. of benzene is refluxed for five hours, and is then evaporated. The residue is treated with diethyl ether to yield 1.0 g. of 2-benzyl-3-methyl-4-phenyl-1,4-dihydro-1,4-ethano-isoquinolinium chloride of the formula

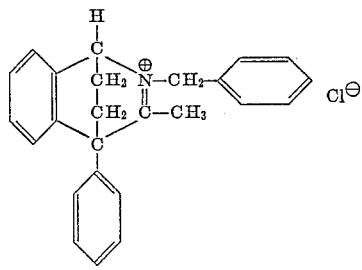

which melts as the hemihydrate at 231–233° after recrystallization from a mixture of methanol, acetone and diethyl ether. It analyzes as follows: Calcd. for $C_{25}H_{24}NCl$: ½$H_2O$: C, 78.41; H, 6.58; N, 3.66. Found: C, 77.87; H, 6.56; N, 3.70; and its infrared spectrum (taken in mineral oil) has a strong peak at 6.09μ.

Example 7

A mixture of 2.0 g. of 3-methyl-4-phenyl-1,4-dihydro-1,4-ethano-isoquinoline and 15 ml. of 2-phenylethyl iodide in 50 ml. of toluene is refluxed for 3½ hours and is then evaporated under reduced pressure. The residue is crystallized from a mixture of acetone, methanol and diethyl ether to yield 2.4 g. of the 3-methyl-4-phenyl-2-(2-phenylethyl)-1,4-dihydro-1,4-ethanoisoquinolinium iodide of the formula

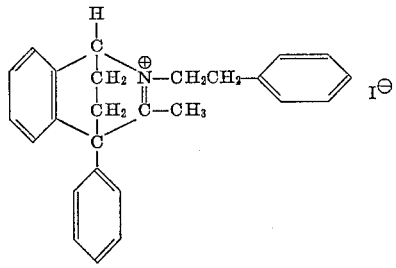

which melts at 215.5–216.5° (with decomposition) after further recrystallization from the above solvent mixture, and analyzes as follows: Calcd. for $C_{26}H_{26}NI$: C, 65.13; H, 5.47; N, 2.92. Found: D, 64.97; H, 5.55; N, 2.82. Its infrared spectrum (taken in mineral oil) shows a sharp peak at 6.08μ.

Example 8

A mixture of 1.0 g. of 3-methyl-4-phenyl-1,4-dihydro-1,4-ethano-isoquinoline and 15 ml. of allyl iodide in 50 ml. of benzene is refluxed for fifteen minutes and is then evaporated to yield a residue, which crystallizes from a mixture of methanol, acetone and diethyl ether, yield: 1.0 g. The resulting 2-allyl-3-methyl-4-phenyl-1,4-dihydro-1,4-ethano-isoquinolinium iodide of the formula

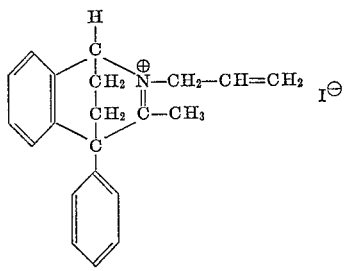

melts at 208–210° (with decomposition) after recrystallization from the same solvent mixture; it analyzes as follows: Calcd. for $C_{21}H_{22}NI$: C, 60.73; H, 5.34; N, 3.37. Found: C, 60.58; H, 5.40; N, 3.31; and its infrared absorption spectrum (taken in mineral oil) shows a peak at $6.16\mu$, indicating that the allyl-double bond influences the —C=N— double bond stretching.

Example 9

A total of 24.8 g. of 2-methyl-3-methylene-4-phenyl-1,2,3,4-tetrahydro-1,4-ethano-isoquinoline in 400 ml. of benzene and 100 ml. of dry diethyl ether is treated dropwise with a sufficient amount of an about 5 percent solution of hydrogen chloride in ethanol to cause complete precipitation of the 2,3-dimethyl-4-phenyl-1,4-dihydro-1,4-ethano-isoquinolinium chloride. The crystalline material is filtered off, washed with dry diethyl ether and dried at room temperature under reduced pressure, yield: 28.7 g.; it melts as the monohydrate at 242–244° (with decomposition) and analyzes as follows: Calcd. for $C_{19}H_{20}NCl \cdot H_2O$: C, 72.25; H, 7.02; N, 4.44. Found: C, 71.72; H, 6.99; N, 4.53.

The starting material used is prepared as follows: To the mixture of 193.0 g. diphenylacetonitrile, 30 ml. of a 40% solution of benzyl-trimethyl-ammonium methoxide in methanol and 400 ml. tetrahydrofuran 53.0 g. acrylonitrile in 100 ml. tetrahydrofuran are added over a period of 15 minutes while maintaining the temperature at 20° or below. The mixture is allowed to stand for 1½ hours, it is then treated with a mixture of ice and hydrochloric acid and extracted with diethyl ether. The extract is washed with diluted aqueous sodium hydroxide and water, dried and concentrated to a volume of about 250 ml. Upon cooling to 0° the α,α-diphenyl-glutaronitrile precipitates; a sample, recrystallized from diethyl ether, melts at 73–74.5°.

The mixture of 98.0 g. thereof and the solution of 545.0 g. potassium hydroxide in 660 ml. water is refluxed at 100–110° for four days while stirring occasionally. The cold solution is then acidified, the resulting α,α-diphenyl-glutaric acid is filtered off, washed with water and recrystallized from ethyl acetate M.P. 199–200.5°.

95.0 g. thereof are stirred into 1800 ml. concentrated sulfuric acid over a period of ten minutes. The deep red solution obtained is stirred for two hours and allowed to stand overnight at room temperature. It is then poured over ice, the mixture extracted with diethyl ether, the exract washed with water, dried, filtered and evaporated. The residue is recrystallized from diethyl ether to yield the 4-phenyl-1,2,3,4 - tetrahydro-naphthalen - 1 - one-4-carboxylic acid melting at 161.5–163°.

The mixture of 50.0 g. thereof 140 ml. concentrated sulfuric acid, 10 ml. fuming sulfuric acid (containing 30% sulfur trioxide) and 3000 ml. absolute ethanol is refluxed for 18 hours. The solvent is distilled off, the residue cooled and treated with ice. The mixture is extracted with diethyl ether, the extract washed with water, sodium hydroxide and again with water, dried, filtered and evaporated. The residue is recrystallized from diethyl ether to yield the ethyl 4-phenyl-1,2,3,4-tetrahydro-naphthalen-1-one-4-carboxylate melting at 89.5–91°.

The solution of 19.0 g. thereof ethanol is treated with the solution prepared from 48.0 g. hydroxylamine hydrochloride and 19.0 g. sodium hydroxide in 285 ml. water while cooling. The mixture is refluxed for 10 minutes and extracted with diethyl ether. The extract is washed with water, dried, evaporated and the residue recrystallized from aqueous ethanol to yield the ethyl 1-hydroxyimino-4-phenyl-1,2,3,4-tetrahydro-naphthalene - 4 - carboxylate melting at 136–138°.

The mixture of 24.4 g. thereof and 15 g. Raney nickel in 200 ml. ethanol is hydrogenated at an initial pressure of about 2½ atmospheres, first at room temperature, and after one hour at 60°. After the uptake of 2.06 molar equivalents of hydrogen, the catalyst is filtered off, the filtrate evaporated to yield a clear oil having basic properties and representing the ethyl 1-amino - 4-phenyl-1,2,3,4-tetrahydro-naphthalene - 4-carboxylate. Upon standing at room temperature it deposits crystals which are triturated with diethyl ether and recrystallized from methanol to yield 4-phenyl - 1,2,3,4-tetrahydro-1,4-ethano-isoquinolin-3-one melting at 267.5–269°.

The suspension of 7.1 g. thereof, 3.5 g. sodium hydride (in the form of a 53% suspension in mineral oil) and 500 ml. toluene is refluxed and stirred for ½ an hour. After cooling, 30 ml. methyl iodide are added and refluxing is continued for 10 hours while stirring. The cold mixture is filtered, the filtrate diluted with diethyl ether, washed with water, dried, filtered and evaporated. The residue is triturated with diethyl ether and recrystallized from ethyl acetate-methanol to yield the 2-methyl-4-phenyl - 1,2,3,4 - tetrahydro - 1,4-ethano-isoquinoline-3-one melting at 198.5–201.5°.

To a Grignard reagent, prepared from 1.2 g. of magnesium turnings and 7 ml. of methyl iodide in 50 ml. of dry diethyl ether, is added 1.7 g. of the 2-methyl-4-phenyl-1,2,3,4-tetrahydro - 1,4-ethano-isoquinolin-3-one in 220 ml. of toluene. The reaction mixture is boiled for about thirty minutes to remove low boiling materials, and upon reaching a temperature of 95–100°, the reaction mixture is refluxed for two hours and then heated overnight on a steam bath under a reflux condenser. The resulting gray suspension is treated with water, then with a dilute solution of 6 ml. of glacial acetic acid. Diethyl ether is added, the mixture is shaken and the layers are separated. The weakly acidic aqueous solution is made basic with potassium carbonate, and the organic material is extracted with diethyl ether. The organic solution is washed three times with water, dried over potassium carbonate, filtered and evaporated to yield a yellow, semi-crystalline material representing the desired 2-methyl-3-methylene-4-phenyl-1,2,3,4-tetrahydro-1,4-ethano-isoquinoline.

The above 2-methyl - 3 - methylene - 4-phenyl-1,2,3,4-tetrahydro - 1,4-ethano-isoquinoline is characterized as follows: A mixture of about 0.5 g. of 2-methyl-3-methylene-4-phenyl - 1,2,3,4-tetrahydro - 1,4-ethano-isoquinoline and 10 ml. of methyl iodide, containing a small amount of ethanol is boiled on the steam bath for ten minutes. After cooling, a small amount of dry diethyl ether is added; the resulting oily material is washed with diethyl ether by decanting the solvent, and is then crystallized by taking it up in a small amount of methanol and adding dry diethyl ether until turbidity. The crystalline 2,2-dimethyl - 3 - methyl - 4 - phenyl - 1,2,3,4-tetrahydro-isoquinolinium iodide is filtered off, washed with diethyl ether and recrystallized once from ethanol and twice from a mixture of ethanol and diethyl ether to yield the monohydrate, M.P. 259–263° (with decomposition). It analyzes as follows: Calcd. for $C_{20}H_{22}NI \cdot H_2O$: C, 57.01; H, 5.74; N, 3.32. Found: C, 57.76; H, 6.04; N, 3.34; and its infrared absorption spectrum (taken in mineral oil) shows a strong OH band, and peaks at 4.97–4.98μ and 6.23μ.

The 2-methyl - 3-methylene - 4-phenyl - 1,2,3,4-tetrahydro-1,4-ethano-isoquinoline is also prepared as follows: To 1.0 g. of 2-methyl - 4-phenyl - 1,2,3,4-tetrahydro-1,4-ethano-isoquinolin-3-one are added 24 ml. of a 1.92 molar solution of methyl lithium in diethyl ether, and then 150 ml. of benzene. The reaction mixture is refluxed for one hour, whereupon a yellow precipitate is formed, and, after cooling, is diluted with cold water. The organic material is extracted with diethyl ether, the organic solution is washed twice with water and is then extracted with two portions of a 1:1-mixture of concentrated hydrochloric acid and water. After chilling, the acidic extracts are made basic with an aqueous solution of sodium hydroxide; a precipitate forms upon cooling, which is filtered off and washed with water to yield 1.1 g. of the 2-methyl-3-methylene - 4-phenyl - 1,2,3,4-tetrahydro - 1,4-ethano-isoquinoline, which melts at 172–175° (with decomposition) after recrystallization from diethyl ether.

Example 10

A solution of the crude 3-n-butylidene - 2-methyl-4-phenyl - 1,2,3,4-tetrahydro - 1,4-ethano-isoquinoline (prepared according to the procedure described below) in dry diethyl ether is treated with ethanolic hydrogen chloride until no further precipitate is formed. The crude 3-n-butyl - 2-methyl-4-phenyl - 1,2,3,4-tetrahydro-1,4-ethano-isoquinolinium chloride of the formula

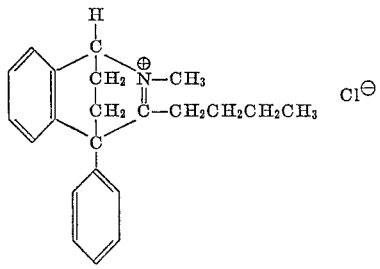

is collected, and after the addition of a small amount of ethanol, washed with diethyl ether containing some ethanol, and recrystallized from diethyl ether and ethanol. It melts as the hemihydrate, M.P. 242–244° (with decomposition) after drying at 80° under reduced pressure, and analyzes as follows: Calcd. for $C_{22}H_{26}ClN·½H_2O$: C, 75.73; H, 7.80; N, 4.01. Found: C, 75.78; H, 7.77; N, 3.91. Its infrared absorption spectrum (taken in mineral oil) shows the hydroxyl band and a sharp peak at 6.06μ.

The starting material used in the above procedure is prepared as follows: A mixture of 1.3 g. of 2-methyl-4-phenyl - 1,2,3,4-tetrahydro - 1,4-ethano-isoquinolin-3-one in 100 ml. of toluene is treated with 30 ml. of an about 10 percent n-butyl lithium solution in hexane. The exothermic reaction yields an orange-colored solution, which is refluxed for 1½ hours, and is then cooled, treated with cold water and extracted with diethyl ether. The organic solution is washed three times with water, dried over potassium carbonate and evaporated to yield the noncrystalline 3-n-butyliden - 2-methyl - 4-phenyl - 1,2,3,4-tetrahydro-1,4-ethano-isoquinoline of the formula

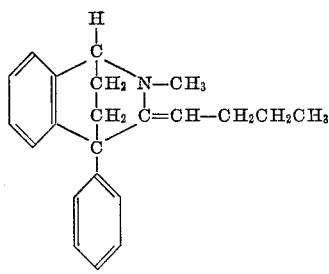

which is used without further purification.

Example 11

A solution of about 4.0 g. of 3-ethylidene-2-methyl-4-phenyl-1,2,3,4-tetrahydro - 1,4 - ethano-isoquinoline (prepared according to the procedure described below) in about 100 ml. of diethyl ether is treated with ethanolic hydrogen chloride until the precipitation of the crystalline material is complete. The latter is collected, washed with diethyl ether containing a small amount of ethanol and is recrystallized from a mixture of ethanol and diethyl ether to yield a total of 2.5 g. of the 3-ethyl-2-methyl-4-phenyl-1,4-dihydro-1,4-ethano-isoquinolinium chloride of the formula

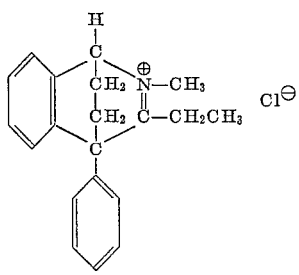

which melts as the monohydrate at 239–240° (with decomposition) after recrystallization from a mixture of ethanol and diethyl ether and drying at 80° under reduced pressure. It analyzes as follows: Calcd. for $C_{20}H_{24}ClN·H_2O$ C, 72.82; H, 7.33; N, 4.25. Found: C, 73.66; H, 7.40; N, 4.16; and its infrared absorption spectrum (taken in mineral oil) shows a broad OH band and a sharp peak at 6.07μ.

The starting material used in the above procedure is prepared as follows: A solution of 3.9 g. of 2-methyl-4-phenyl-1,2,3,4-tetrahydro-1,4-ethano - isoquinolin-3-one in 200 ml. of reagent benzene is treated with 24 ml. of a 2.1 molar solution of ethyl lithium in benzene. The mildly exothermic reaction forms an orange solution, which is allowed to stand at room temperature for three hours, and is then refluxed for thirty minutes. After being worked up as described in Example 10, the reaction mixture yields about 5.0 g. of the crude 3-ethylidene-2-methyl-4-phenyl-1,2,3,4-tetrahydro-1,4-ethano-isoquinoline of the fromula

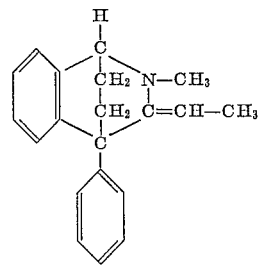

which is obtained crystalline and melts at 107–109° after three recrystallizations from anhydrous diethyl ether. It analyzes as follows: Calcd. for $C_{20}H_{21}N$: C, 87.22; H, 7.69; N, 5.09. Found: C, 87.67; H, 7.86; N, 5.11; and its infrared absorption spectrum (taken in mineral oil) shows a moderate, sharp peak at 6.04μ and a weaker peak at 6.23μ, with no indication of an NH or an OH band.

Example 12

A solution of 0.2 g. of 3-ethylidene-2-methyl-4-phenyl-1,2,3,4-tetrahydro-1,4-ethano-isoquinoline in diethyl ether is treated gradually with 1 ml. of concentrated hydriodic acid (about 57%) in 5 ml. of ethanol. The resulting crystalline material is filtered off and washed with diethyl ether to yield the 3-ethyl-2-methyl-4-phenyl-1,4-dihydro-1,4-ethano-isoquinolinium iodide, which melts at 235.5–237.5° and analyzes as follows: Calcd. for $C_{20}H_{22}NI$: C, 59.56; H, 5.50; N, 3.47. Found: C, 59.09; H, 6.04; N, 3.20. The infrared absorption spectrum (taken in mineral oil) shows an OH band (indicating some hydration) and a peak at 6.05μ.

Example 13

To a solution of 0.2 g. of 2-methyl-3-methylene-4-phenyl-1,2,3,4-tetrahydro-1,4-ethano-isoquinoline in dry diethyl ether is added 2 ml. of benzyl bromide. After standing at room temperature, the reaction mixture is warmed on the steam bath until the ether is evaporated; the oily residue crystallizes after ten minutes on the steam bath and is allowed to stand for twenty hours. It is suspended in dry diethyl ether, filtered off and washed with diethyl ether to yield the 2,3-dimethyl-4-phenyl-1,4-dihydro-1,4-ethano-isoquinolinium bromide which melts as the hemihydrate at 252–254° (with decomposition) after recrystallization from a mixture of ethanol and diethyl ether. It analyzes as follows: Calcd. for

C, 64.96; H, 6.03; N, 3.99. Found: C, 64.86; H, 6.25; N, 3.94; and shows a broad OH band and a sharp peak of 6.05μ in the infrared absorption spectrum (taken in mineral oil).

Example 14

A solution of 2.0 g. of 3-methyl-4-phenyl-1,4-dihydro-1,4-ethano-isoquinoline and 15 ml. of ethyl bromoacetate in 30 ml. of ethanol is refluxed for thirty minutes. After concentrating the reaction mixture the remaining solvent is decanted from the partly crystalline product, which is triturated with diethyl ether to yield 3.2 g. of the 2-carbethoxymethyl - 3 - methyl - 4 - phenyl-1,4-dihydro-1,4-ethano-isoquinolinium bromide of the formula

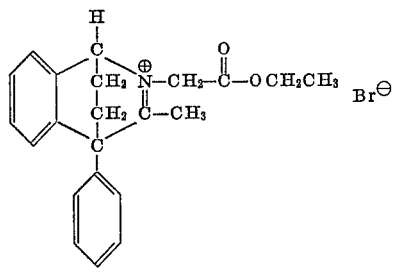

which melts at 186–187° (with decomposition) after recrystallization from a mixture of ethanol and diethyl ether. It analyzes as follows: Calcd. for $C_{22}H_{24}BrNO_2$: C, 63.77; H, 5.84; N, 3.38. Found: C, 64.03; H, 5.92; N, 3.25; and its infrared absorption spectrum (taken in mineral oil) shows peaks at 5.71μ and 6.09μ.

Example 15

To a solution of 1.0 g. of 2-carbethoxymethyl-3-methyl - 4 - phenyl - 1,4 - dihydro - 1,4 - ethano - isoquinolinium bromide in 75 ml. of water is added 50 ml. of a 5 percent aqueous solution of potassium hydroxide. The resulting oily material is extracted with three portions of diethyl ether, the organic solution is washed with two portions of water, dried over potassium carbonate and evaporated under reduced pressure while maintaining the temperature below 40°. The resulting 2-carbethoxymethyl - 3 - methylene - 4 - phenyl - 1,2,3,4 - tetrahydro - 1,4-ethano-isoquinoline of the formula

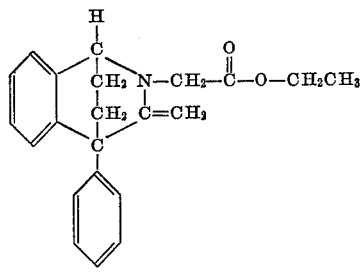

is obtained in the form of an oil and is used without further purification.

A solution of the above oily base in 50 ml. of dry diethyl ether is treated with 1 ml. of a 5 percent ethanol solution of hydrogen chloride. The oily material is separated, decanted several times with diethyl ether and then dissolved in about 3 ml. of ethanol. The solution is diluted with 50 ml. of diethyl ether, and the desired 2-carbethoxymethyl - 3 - methyl - 4 - phenyl - 1,4 - dihydro-1,4 - ethano - isoquinolinium chloride crystallizes upon scratching. After being washed with diethyl ether containing a small amount of ethanol and dried, the hygroscopic compound melts at 184–185° (with decomposition), and analyzes as follows: Calcd. for

C, 69.19; H, 6.68; N, 3.67. Found: C, 69.14; H, 6.92; N, 3.72. Its infrared absorption spectrum (taken in mineral oil) shows a broad OH band and peaks at 5.75μ and 6.07–6.12μ; and its ultraviolet absorption spectrum (taken in ethanol) shows $\lambda_{max.}$ at 257 mμ (ε=1,010); at 260 mμ (ε=930), and at 263 mμ (ε=263), and shoulders at 240 mμ, 250 mμ and 266 mμ.

Example 16

The 3,4-dimethyl-1,4-dihydro - 1,4 - ethano-isoquinoline prepared according to the procedure described below is reacted with an excess of methyl iodide. After evaporating the reagent the residue is crystallized from a mixture of ethanol and diethyl ether to yield the 2,3,4-trimethyl-1,4-dihydro-1,4-ethano-isoquinolinium iodide of the formula

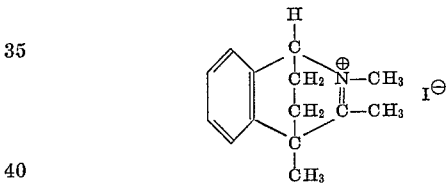

which melts at 213–215° (with decomposition) after recrystallization from ethanol and diethyl ether. It analyzes as follows: Calcd. for $C_{14}H_{18}IN$: C, 51.39; H, 5.54; N, 4.28. Found: C, 51.27; H, 5.46; N, 4.20; and its infrared absorption spectrum (taken in mineral oil) shows a sharp peak at 6.06μ.

The starting material used is prepared as follows: The solution of 122.0 g. phenylacetone in 400 ml. dry diethyl ether is added over a period of 15 minutes to a stirred, ice chilled suspension of sodium methoxide, prepared from 23.0 g. sodium, in 300 ml. diethyl ether. After 20 minutes 128.0 ml. methyl iodide are added over a period of 15 minutes. The ice-bath is then removed, and the reaction mixture is stirred for 6 hours. The precipitate formed is filtered off, the filtrate washed with water, dried and evaporated, to yield the 3-phenyl-2-butanone, which is used without further purification (its semicarbazone melts at 175–176° after recrystallization from ethanol).

The solution of all but about 1.0 g. thereof in 500 ml. tetrahydrofuran is cooled to 20°, and treated with 30 ml. of a 40% solution of benzyl-trimethyl-ammonium methoxide in methanol and then over a period of 15 minutes with a solution of 47.6 g. acrylonitrile in 100 ml. tetrahydrofuran, while keeping the temperature at 20–30° by cooling, if necessary. After standing at room temperature for 2 hours, the reaction mixture is treated with diluted hydrochloric acid, ice and water. It is extracted with diethyl ether, the extract dried and evaporated to yield the γ-acetyl-γ-phenyl-valeronitrile, which is used without further purification.

The solution of the whole amount obtained thereof, in 2200 ml. of a 1:1-mixture of concentrated hydrochloric acid and glacial acetic acid is refluxed for 3 hours. A portion of the solvent is distilled off, the residue treated with ice and water, and extracted with diethyl ether. The extract is washed with water and diluted aqueous potassium hydroxide. The basic solution is acidified with hydrochloric acid, extracted with diethyl ether, the extract washed with water, dried and evaporated to yield the crude γ-acetyl-γ-phenyl-butyric acid. It is purified by distillation and collected at 174–176.5°/0.6 mm. Hg. It crystallizes and melts after recrystallization from diethyl ether at 73–74°.

The solution of 25.0 g. thereof in 500 ml. concentrated sulfuric acid is allowed to stand overnight at room temperature, and is then poured onto ice. The mixture is extracted with diethyl ether, the extract washed with diluted aqueous potassium hydroxide and dried to yield the 4-acetyl-4-methyl-1,2,3,4-tetrahydronaphthalen-1-one as a pale-yellow oil, which is used without further purification.

The solution of 14.4 g. thereof in 240 ml. ethanol is treated with the solution of 51.0 g. hydroxylamine hydrochloride and 18.0 g. sodium hydroxide in 360 ml. water. After refluxing for 15 minutes, and cooling, the resulting 4-acetyl-4-methyl-1,2,3,4-tetrahydro-naphthalen-1-one dioxime is filtered off, washed with aqueous ethanol and air-dried; it melts at 224–226° after recrystallization from ethanol.

A mixture of 11.6 g. of 4-acetyl-4-methyl-1,2,3,4-tetrahydro-naphthalen-1-one dioxime and 2.3 g. of palladium catalyst (5 percent palladium on charcoal) in 300 ml. of ethanol is shaken at room temperature in an atmosphere of hydrogen with an initial pressure of about 3½ atmospheres. The hydrogenation is interrupted after the absorption of 2.28 molar equivalents, the catalyst is filtered off, and the solvent is evaporated. The crude oil is triturated with diethyl ether to yield 0.6 g. of unreacted 4-acetyl-4-methyl-1,2,3,4-tetrahydro-naphthalen-1-one dioxime, and the organic solution is extracted with aqueous hydrochloric acid. The chilled acidic extract is carefully treated with the aqueous solution of potassium hydroxide. The resulting oil is extracted with diethyl ether, washed with water, dried over potassium carbonate and evoporated to yield 5.0 g. of a crude material.

A solution of 3.0 g. of this product is dissolved in a mixture of ethyl acetate and n-butanol is treated with ethanolic hydrogen chloride. The crystalline material is collected in several crops (yield: 0.85 g.) and recrystallized from a mixture of methanol and diethyl ether to give the 3,4-dimethyl-1,4-dihydro-1,4-ethano-isoquinoline hydrochloride which, after drying at 65° under reduced pressure, melts at 234–245°, solidifies and remelts at 298–301° (with decomposition). It analyzes as follows: Calcd. for $C_{13}H_{16}ClN$: C, 70.42; H, 7.27; N, 6.32. Found: C, 70.70; H, 7.35; N, 6.25; and its infrared spectrum (taken in mineral oil) shows a peak at 5.99μ and pronounced immonium salt bands at 4.96μ and 5.28μ. The properties and spectral data of this compound indicate that part of the compound is in the enamine form of the 4-methyl-3-methylene-1,2,3,4-tetrahydro-1,4-ethano-isoquinoline hydrochloride of the formula

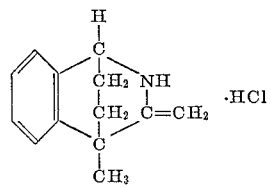

The amount of 3,4-dimethyl-1,4-dihydro-1,4-ethano-isoquinoline hydrochloride obtained from two reductions of 4-acetyl-4-methyl-1,2,3,4-tetrahydro-naphthalen-1-one dioxime, each using 10.0 g. of the starting material, according to the previously described procedure, is dissolved in a small amount of water, washed with diethyl ether, and made basic with an aqueous solution of potassium hydroxide while cooling to 0°. The precipitate is filtered off, washed with ice water and dried under reduced pressure to yield the desired 3,4-dimethyl-1,4-dihydro-ethano-isoquinoline, which melts at 38–39°. Its recrystallization is unfeasible; its infrared absorption spectrum (taken in mineral oil) shows a sharp peak at 6.11μ.

Example 17

A mixture of 3,4-dimethyl-1,4-dihydro-1,4-ethano-isoquinoline and an excess of benzyl bromide, as well as a small amount of ethanol, is warmed on the steam bath. The crystalline material is isloated by trituration of the reaction product with a mixture of ethanol and diethyl ether; the colorless 2-benzyl-3,4-dimethyl-1,4-dihydro-1,4-ethano-isoquinolinium bromide of the formula

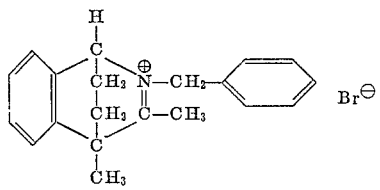

melts at 235–237° (with decomposition) and is water-soluble. It analyzes as follows: Calcd. for $C_{20}H_{22}BrN$: C, 67.41; H, 6.23; N, 3.93. Found: C, 67.55; H, 6.22; N, 3.77; and its infrared absorption spectrum (taken in mineral oil) shows a peak at 6.08μ.

Example 18

A solution of 0.4 g. of 2-methyl-3-methylene-1,2,3,4-tetrahydro-1,4-ethano-isoquinoline in diethyl ether is filtered and gradually treated with a solution of 1 ml. of concentrated hydriodic acid (53 percent) in 5 ml. of ethanol until no further precipitation is observed. The orange precipitate is filtered off, washed once with diethyl ether and dissolved in a minimum amount of warm ethanol. Upon standing, the desired 2,3-diethyl-1,4-dihydro-1,4-ethano-isoquinolinium iodide of the formula

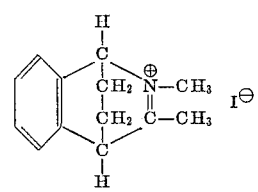

crystallizes, is filtered off and recrystallized from ethanol, M.P. 217.5–219.5° (with decomposition). It analyzes as follows: Calcd. for $C_{13}H_{16}NI$: C, 49.85; H, 5.15; N, 4.47. Found: C, 49.64; H, 5.30; N, 4.24; and its infrared absorption spectrum shows a sharp peak at 6.01μ.

In a second experiment using 1.1 g. of the 2-methyl-3-methylene-1,2,3,4-tetrahydro - 1,4 - ethano-isoquinoline and reacting it with a concentrated hydriodic acid, 1.0 g. of the desired 2,3-dimethyl-1,4-dihydro-1,4-ethano-isoquinolinium iodide is obtained.

The starting material used in the above procedure is prepared as follows: To a suspension of sodium methoxide (prepared from 4.6 g. of sodium) in 1000 ml. of tertiary butanol is added 164.0 g. of ethyl phenylacetate, followed, over a period of five minutes, by 86.1 g. of methyl acrylate while stirring. The deep red-brown solution is allowed to stand for 1½ hours and is then concentrated under reduced pressure to a volume of about 350 ml. After cooling, the reaction mixture is poured onto ice, and is extracted with diethyl ether; the organic solution is washed with water until neutral, dried over magnesium sulfate, and evaporated to yield 240.0 g. of the crude methyl α-carbethoxy-α-phenyl-butyrate, which is used without further purification.

A mixture of 240.0 g. of methyl α-carbethoxy-α-phenyl-butyrate and 2000 ml. of a 10 percent aqueous solution of potassium hydroxide is refluxed for about two hours, allowed to stand overnight and again refluxed for 1½ hours. An additional 150.0 g. of potassium hydroxide in 300 ml. of water, and 30 ml. of ethanol are added, and refluxing is continued for 5¼ hours until a clear solution is obtained. After cooling, it is washed with diethyl ether, and rendered acidic with a mixture of concentrated hydrochloric acid and ice. The oily α-phenyl-glutaric acid is extracted with diethyl ether; the organic solution is washed several times with water, dried over magnesium sulfate and evaporated to yield 194.0 g. of the crude oily product, which is used without further purification.

A mixture of 97.0 g. of the crude α-phenyl-glutaric acid and 100 ml. of acetic anhydride is refluxed for one hour, and the excess of the reagent is removed by distillation under reduced pressure until the temperature rises to about 143° at atmospheric pressure. The remaining α-phenyl-glutaric anhydride is recovered by distillation and is collected at 170–180°/0.5–0.7 mm. It crystallizes rapidly and melts at 92–95° after recrystallization from a small amount of ethyl acetate.

A mixture of 39.0 g. of α-phenyl-glutaric anhydride and 250 ml. of concentrated sulfuric acid is heated to 65–70° for one-half hour and is allowed to stand at room temperature overnight. It is then poured onto ice, and the viscous oily material is extracted with diethyl ether. The organic solution is washed with several portions of water, dried over magnesium sulfate, and evaporated to yield 36.0 g. of the oily 1,2,3,4-tetrahydro-naphthalen-1-one 4-carboxylic acid, which crystallizes from diethyl ether, M.P. 94–96°; yield: 23.5 g.

A mixture of 39.9 g. of 1,2,3,4-tetrahydro-naphthalen-1-one 4-carboxyl acid and a solution of 54 ml. of concentrated sulfuric acid and 3.6 ml. of 30 percent oleum in 1500 ml. of absolute ethanol is refluxed for three hours. The excess of ethanol is removed by distillation under reduced pressure, and the residue is poured over ice. The aqueous mixture is extracted with diethyl ether; the organic extract is washed with three portions of water, a dilute aqueous solution of sodium hydroxide, and again with water, dried over magnesium sulfate, and evaporated to yield 24.9 g. of the oily ethyl 1,2,3,4-tetrahydro-naphthalen-1-one 4-carboxylate. Its semicarbazone melts at 179.5–180.5° after recrystallization from methanol, and its 2,4-dinitro-phenyl-hydrazone at 156.5–158.5° after recrystallization from ethyl acetate.

A solution of 20.0 g. of ethyl 1,2,3,4-tetrahydro-naphthalen-1-one 4-carboxylate and 50 g. of hydroxylamine hydrochloride in 200 ml. of water containing 20.0 g. of sodium hydroxide and 130 ml. of ethanol is refluxed for one hour. Upon cooling and diluting the reaction mixture with water, an oily material separates, which is extracted with diethyl ether; the organic solution is washed with three portions of water, dried over magnesium sulfate, and evaporated to yield 21.9 g. of the non-crystalline ethyl 1-hydroxyimino-1,2,3,4-tetrahydro-naphthalene 4-carboxylate. Its infrared absorption spectrum (taken in mineral oil) has a broad hydroxyl band, an ester peak at 5.82μ and no ketone peak.

A mixture of 24.0 g. of ethyl 1-hydroxyimino-1,2,3,4-tetrahydro-naphthalene 4-carboxylate in 300 ml. of ethanol and about 15.0 g. of Raney nickel (wet with water) is treated with hydrogen at an initial pressure of 3½ atmospheres. After the uptake of 2 molar equivalents of hydrogen (about 1¼ hours), the reaction is interrupted, the catalyst is filtered off, and the filtrate is evaporated to yield 22.1 g. of the oily ethyl 1-amino-1,2,3,4-tetrahydro-naphthalene 4-carboxylate, representing the non-crystalline mixture of the cis- and the trans-isomer.

A total of 22.1 g. of the above crude mixture of the cis- and the trans-isomer of ethyl 1-amino-1,2,3,4-tetrahydro-naphthalene 4-carboxylate in an open vessel is heated on a steam bath for two days. The crystalline material, which gradually separates, is removed by trituration with diethyl ether to yield four crops for a total of 12.4 g. of 1,2,3,4-tetrahydro-1,4-ethano-isoquinolin-3-one of the formula

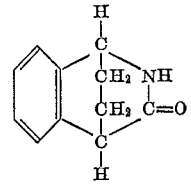

which melts at 200–201° after recrystallization from methanol. It analyzes as follows: Calcd. for $C_{11}H_{11}NO$: C, 76.27; H, 6.40; N, 8.09. Found: C, 76.26; H, 6.45; N, 7.97; and shows the following peaks in the infrared absorption spectrum (taken in mineral oil): 3.13μ and 5.98–6.10μ.

A mixture of 5.2 g. of 1,2,3,4-tetrahydro-1,4-ethano-isoquinolin-3-one in 180 ml. of toluene, 3.37 g. of a 56 percent suspension of sodium hydride in mineral oil and 20 ml. of methyl iodide is refluxed for seven hours while stirring, and is then allowed to stand overnight at room temperature. After filtration, the reaction mixture is washed twice with water, dried over magnesium sulfate and evaporated. The residual oil crystallizes upon adding a small amount of diethyl ether to yield 5.2 g. of the crystalline 2-methyl-1,2,3,4-tetrahydro-1,4-ethano-isoquinolin-3-one of the formula

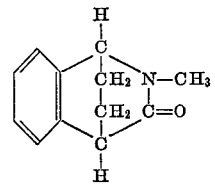

which melts at 133–135° after recrystallization from diethyl ether. It analyzes as follows: Calcd. for $C_{12}H_{13}NO$: C, 76.97; H, 7.00; N, 7.48. Found: C, 77.29; H, 7.07; N, 7.28; and its infrared absorption spectrum (taken in ethanol) shows a peak at 6.00μ and no NH-bands.

A solution of 2.6 g. of 2-methyl-1,2,3,4-tetrahydro-1,4-ethano isoquinolin-3-one in 100 ml. of benzene is treated with 10.5 ml. of a 1.92 molar solution of methyl lithium in diethyl ether. After the exothermic reaction subsides, the reaction mixture is allowed to stand overnight at room temperature; it is then chilled and poured into cold water and extracted with diethyl ether. The organic solution is washed twice with water and is then extracted with two portions of 25 ml. each of a 1:1-mixture of concentrated hydrochloric acid and water. The acidic extracts are made basic with a concentrated aqueous solution of sodium hydroxide while chilling in an ice bath; the resulting colorless oil is extracted with diethyl ether, and the organic solution is washed with water, dried over potassium carbonate and evaporated without appreciable heating to yield 1.2 g. of the 2-methyl-3-methylene-1,2,3,4-tetrahydro-1,4-ethano-isoquinoline of the formula

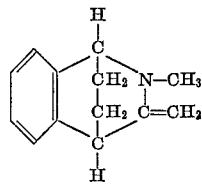

which is used without further purification.

Example 19

A solution of 0.4 g. of 2-methyl-3-methylene-1,2,3,4-tetrahydro-1,4-ethano-isoquinoline in diethyl ether is treated dropwise with a solution of hydrogen chloride in ethanol. The resulting oily material is washed twice with diethyl ether by decanting the solvent, dissolved in a small amount of ethanol and diluted with dry diethyl ether until turbidity. The desired 2,3-dimethyl-1,4-dihydro-1,4-ethano-isoquinolinium chloride crystallizes and is recrystallized from a mixture of ethanol and diethyl ether, M.P. 259–261° (with decomposition) after drying at 60–70° under reduced pressure.

Example 20

The pale yellow solution of 4-cyclohexylmethyl-2-methyl-3-methylene-1,2,3,4-tetrahydro - 1,4 - ethano-isoquinoline in diethyl ether (as prepared according to the procedure described below) is treated with a slight excess of hydrogen chloride in ethanol. The solvent is decanted from the resulting precipitate; the latter is washed by decantation with diethyl ether and is then allowed to stand overnight at 0° in the presence of a small amount of a mixture of diethyl ether and ethanol. The resulting 4-cyclohexyl - methyl-2,3-dimethyl-1,4-dihydro-1,4-ethano-isoquinolinium chloride of the formula

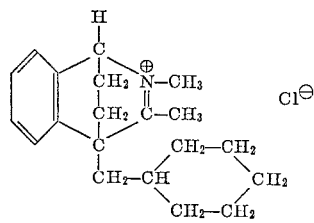

is dissolved in a small amount of ethanol and reprecipitated with diethyl ether to yield a hygroscopic voluminous white gel, which is filtered off, treated with a few drops of ethanol and then dried on the filter. The colorless crystalline materials melts at 235–240° (with decomposition); yield: 1.6 g. It is recrystallized by dissolving it in ethanol and precipitating with diethyl ether while seeding with a sample, and then from a mixture from ethanol, isopropanol and diethyl ether, and dried under reduced pressure at 80°; the colorless crystalline monohydrate melts at 236–238.5° (with decomposition) and analyzes as follows: Calcd. for $C_{20}H_{28}ClN \cdot H_2O$: C, 71.51; H, 9.00; N, 4.17. Found: C, 71.27; H, 8.78; N, 4.09. The infrared absorption spectrum (taken in mineral oil) shows a band at $6.06\mu$ and hydrate bands at $2.88$–$2.95\mu$, and the ultra-violet absorption spectrum (taken in ethanol) shows shoulders at 228 m$\mu$ ($\epsilon=1,900$) and at 266 m$\mu$ ($\epsilon=780$) and a plateau at 248–250 m$\mu$ ($\epsilon=840$).

The starting material used in the above procedure is prepared according to the method described in Examples 9 and 18: By reacting 117.0 g. of phenylacetonitrile in toluene with 43.0 g. of sodium amide and then with 194.0 g. of cyclohexylmethyl bromide, 130.0 g. of the red oily β-cyclohexyl-α-phenyl-propionitrile is obtained, which is dissolved in tertiary butanol and treated with 15 ml. of a 40 percent solution of benzyl-trimethyl-ammonium hydroxide and then with 60 ml. of methyl acrylate to yield 189.5 g. of the crude oily methyl γ-cyano-δ-cyclohexyl-γ-phenyl-valerate. The latter is refluxed for two hours with 500 ml. of concentrated hydrochloric acid and 900 ml. of glacial acetic acid, to which another 100 ml. of concentrated hydrochloric acid is added. After refluxing for 1 to 1½ hours, a portion of the acidic reagents is removed by distillation under reduced pressure and diluted with ice water. The resulting paste is washed with water, partly crystallizes upon adding a small amount of diethyl ether. The crystalline α-cyclohexylmethyl-α-phenyl-glutaric acid imide is washed with diethyl ether (yield: 48 g.) and purified with methanol, M.P. 150–151°. It analyzes as follows: Calcd. for $C_{18}H_{23}NO_2$: C, 75.75; H, 8.12; N, 4.91. Found: C, 76.46; H, 8.22; N, 4.94; and its infrared absorption spectrum (taken in mineral oil) shows a band at $3.11\mu$ and a doublet at $5.81$–$5.89\mu$.

A mixture of 34.5 g. of α-cyclohexylmethyl-α-phenyl-glutaric acid imide and 600 ml. of a 30 percent aqueous solution of potassium hydroxide is refluxed during several periods for a total of eight hours distributed over two days. The cold solution yields 35.5 g. of the crystalline γ - carbamyl-δ-cyclohexyl - γ - phenyl - valeric acid, M.P. 225–226°, after recrystallization from methanol and drying. It analyzes as follows: Calcd. for $C_{18}H_{25}NO_3$: C, 71.25; H, 8.31. Found: C, 71.25; H, 8.21; and its infrared absorption spectrum (taken in mineral oil) shows bands at $5.88\mu$ and at $6.10\mu$, as well as hydrogen-bonded —OH and —NH— bands.

A total of 37.0 g. of γ-carbamyl-δ-cyclohexyl-γ-phenyl-valeric acid is dissolved in 800 ml. of concentrated sulfuric acid; the solution is allowed to stand for three days at room temperature and then poured onto a mixture of ice and water. The organic material is extracted with diethyl ether; the organic solution is washed with water and a dilute aqueous solution of potassium hydroxide, dried over magnesium sulfate and evaporated to yield 24.0 g. of the oily 4-carbamyl-4-cyclohexylmethyl-1,2,3,4-tetrahydro-naphthalen-1-one. The product is characterized as its 2,4-dinitro-phenyl-hydrazone which melts at 235–236° after recrystallization from ethyl acetate; analyzes as follows: Calcd. for $C_{24}H_{27}N_5O_5$: C, 61.92; H, 5.85; N, 15.05. Found: C, 62.34; H, 5.79; N, 14.78; and its infrared absorption spectrum (taken in mineral oil) shows —NH— bands and bands at $5.99\mu$, $6.12\mu$ and $6.25\mu$. It is also characterized as the 4-carbamyl-4-cyclohexylmethyl - 1 - hydroxyimino - 1,2,3,4 - tetrahydronaphthalene (which is prepared by reacting 5.5 g. of 4 - carbamyl - 4 - cyclohexylmethyl - 1,2,3,4 - tetrahydronaphthalen-1-one with 13.75 g. of hydroxylamine hydrochloride in the presence of 5.5 g. of sodium hydroxide using 50 ml. of water and 65 ml. of ethanol as the diluent medium, and which may also be used in the following hydrolysis step); it melts at 177–178° after recrystallization from a mixture of ethanol and pentane, analyzes as follows: Calcd. for $C_{18}H_{24}N_2O_2$: C, 71.97; H, 8.05; N, 9.33. Found: C, 72.23; H, 8.10; N, 9.04; and shows broad multiple —NH— and —OH bands and a band at $6.00\mu$ in the infrared absorption spectrum (taken in mineral oil), and $\lambda_{max.}$ at 210 m$\mu$ ($\epsilon=17,510$) and 256 m$\mu$ ($\epsilon=12,180$) and a shoulder at 299 m$\mu$ ($\epsilon=600$) in the ultraviolet absorption spectrum (taken in ethanol).

A mixture of 27.0 g. of 4-carbamyl-4-cyclohexylmethyl-1,2,3,4-tetrahydro-naphthalen-1-one in 200 ml. of glacial acetic acid and 300 ml. of concentrated hydrochloric acid is refluxed for 5½ hours, then treated with an additional 100 ml. of concentrated hydrochloric acid and refluxed for 1¾ hours. The reaction mixture is concentrated under reduced pressure to a small volume and treated with ice and water; the organic material is extracted with diethyl ether and the organic solution is washed with water and extracted with an aqueous solution of potassium hydroxide. The basic extract is acidified with hydrochloric acid and the acidic solution is extracted with diethyl ether. After drying over magnesium sulfate, the organic solution is evaporated to yield 16.0 g. of the 4-cyclohexylmethyl-1,2,3,4-tetrahydronaphthalen-1-one 4-carboxylic acid, which melts as the monohydrate at 105–108° after recrystallization from aqueous ethanol and analyzes as follows: Calcd. for $C_{18}H_{22}O_3 \cdot H_2O$: C, 71.02; H, 7.95. Found: C, 71.63; H, 8.14. Its infrared absorption spectrum (taken in mineral oil) shows a strong —OH peak and bands at $5.84\mu$ and at $5.96\mu$, and the ultraviolet absorption spectrum (taken in methanol) shows $\lambda_{max.}$ at 206 m$\mu$ ($\epsilon=21,900$), 249 m$\mu$ ($\epsilon=10,740$) and 292 m$\mu$ ($\epsilon=1,730$).

A solution of 10.1 g. of 4-cyclohexylmethyl-1,2,3,4-tetrahydro-naphthalen-1-one 4-carboxylic acid, 35 ml. of concentrated sulfuric acid and 5 ml. of oleum in 1000 ml. of absolute ethanol is refluxed for 2½ days. The excess of ethanol is then distilled off under reduced pressure and the residual syrup is poured over ice. The organic material is extracted with diethyl ether, the organic solution is washed with a dilute solution of potassium hydroxide in water and then with water, dried over magnesium sulfate and evaporated. A total of 10.7 g. of the non-crystalline ethyl 4-cyclohexylmethyl-1,2,3,4-tetrahydro-naphthalen-1-one 4-carboxylate is obtained which is used in the next step without further purification.

A solution of 10.7 g. of ethyl 4-cyclohexylmethyl-1,2,3,4-tetrahydro-naphthalen-1-one 4-carboxylate, 28.0 g. of hydroxylamine hydrochloride and 11.0 g. of sodium hydroxide in 130 ml. of ethanol and 100 ml. of water is refluxed for one hour. After cooling and diluting with water, the resulting ethyl 4-cyclohexylmethyl-1-hydroxy-imino-1,2,3,4-tetrahydro-naphthalene 4-carboxylate is extracted with diethyl ether; the organic solution is washed with water, dried over magnesium sulfate and evaporated (yield: 10.0 g.). The non-crystalline product is used without further purification.

A solution of 7.5 g. of ethyl 4-cyclohexylmethyl-1-hydroxyimino-1,2,3,4-tetrahydro-naphthalene 4-carboxylate in 300 ml. of ethanol is treated at room temperature with hydrogen at an initial pressure of about 3½ atmospheres in the presence of about 7.5 g. of Raney-nickel. After completion of the hydrogenation, the catalyst is then filtered off, and the filtrate is evaporated to yield about 7 g. of the crude mixture of cis- and trans-ethyl 1 - amino - 4 - cyclohexylmethyl - 1,2,3,4 - tetrahydronaphthalene 4-carboxylate, which is heated overnight at 100°. The cooled oil is washed free of basic components with dilute hydrochloric acid. A crystalline sample is obtained by treatment with aqueous methanol and then with diethyl ether. The main batch in diethyl ether is seeded; the crude 4-cyclohexylmethyl-1,2,3,4-tetrahydro-1,4-ethano-isoquinolin-3-one is filtered off and triturated with diethyl ether, M.P. 186–189° (yield: 1.5 g.); it analyzes as follows: Calcd. for $C_{18}H_{23}NO$: C, 80.25; H, 8.61; N, 5.20. Found: C, 79.82; H, 8.71; N, 5.42; and in the infrared spectrum (taken in mineral oil) shows a peak at $5.97\mu$. From the mother liquors, an additional 1.3 g. of the desired 4-cyclohexylmethyl-1,2,3,4-tetrahydro-1,4-ethano-isoquinolin-3-one by reheating the residue on the steam bath.

A mixture of 2.5 g. of 4-cyclohexylmethyl-1,2,3,4-tetrahydro - 1,4 - ethano-isoquinolin-3-one and about 3 g. of sodium hydride in 100 ml. of toluene is refluxed for 45 minutes; the suspension is cooled, treated with 15 ml. of methyl iodide and stirred while refluxing for six hours. After standing overnight, the reaction mixture is treated with ice and diluted with benzene. The separated organic layer is washed repeatedly with water, dried over magnesium sulfate and evaporated to yield a yellow oil, which is allowed to stand at 0° for several days in petroleum ether containing a small amount of cyclohexane. A total of 2.2 g. of 4-cyclohexylmethyl-2-methyl-1,2,3,4-tetrahydro-1,4-ethano-isoquinolin-3-one is obtained, which melts at 71–73° after recrystallization from a mixture of petroleum ether and diethyl ether, and analyzes as follows: Calcd. for $C_{19}H_{25}NO$: C, 80.52; H, 8.89; N. 4.94. Found: C, 80.80; H, 8.95; N, 4.91. Its infrared absorption spectrum (taken in mineral oil) shows a lactam band at $5.97\mu$ and no —NH— band.

A solution of 2.15 g. of 4-cyclohexylmethyl-2-methyl-1,2,3,4-tetrahydro-1,4-ethano-isoquinolin-3-one in 250 ml. of benzene is treated with 28 ml. of a 1.92 molar solution of methyl lithium in diethyl ether, and is then refluxed for one hour and poured over ice-water. The organic material is extracted with diethyl ether; the organic extract is washed with water and is then extracted with two small portions of a 1:1-mixture of concentrated hydrochloric acid and water. The acidic aqueous extract is chilled in ice and made basic by adding concentrated aqueous sodium hydroxide. The desired 4-cyclohexyl-methyl-2-methyl-3-methylene - 1,2,3,4-tetrahydro-1,4-ethano-isoquinoline of the formula

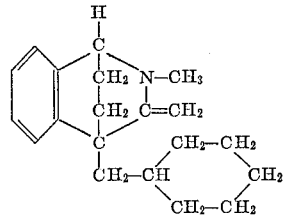

separates as a colorless oil and is extracted with diethyl ether. The organic solution is washed with water, dried over potassium carbonate, evaporated to a volume of about 100 ml. and used without further purification.

Example 21

A solution of 6,7-dimethoxy-2-methyl-3-methylene-4-phenyl-1,2,3,4-tetrahydro-1,4-ethano-isoquinoline in diethyl ether (prepared according to the procedure described below) is treated with a slight excess of ethanolic hydrogen chloride. The brown, semi-solid oil is washed with diethyl ether by decantation and is recrystallized from a mixture of acetone and diethyl ether, and then from a mixture of ethanol and diethyl ether and dried to yield the colorless 6,7-dimethoxy-2,3-dimethyl-4-phenyl-1,4-dihydro-1,4-ethano-isoquinolinium chloride of the formula

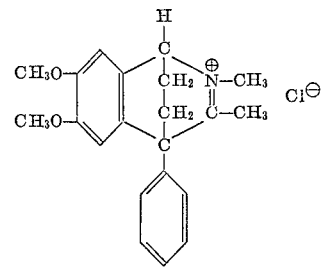

which melts as the monohydrate at 210–213° (with decomposition) and analyzes as follows: Calcd. for $C_{21}H_{24}NO_2Cl \cdot H_2O$: C, 67.10; H, 6.97; N, 3.73. Found: C, 67.32; H, 7.16; N, 3.51. The infrared absorption spectrum (taken in mineral oil and using a more hydrated sample) shows broad hydroxyl bands, and peaks at $6.03\mu$, $6.21\mu$ and $14.3\mu$, and its ultraviolet absorption spectrum (taken in methanol) shows $\lambda_{max.}$ at 231 m$\mu$ ($\epsilon=7,620$) and 283 m$\mu$ ($\epsilon=2,830$).

The starting material used in the above procedure is prepared as follows: To 425 ml. of 74 percent sulfuric acid are added at room temperature 117.0 g. of veratrole and 75.5 g. of mandelonitrile; the temperature rises to 45° and is then brought to 70° and maintained for one hour. After cooling, the reaction mixture is poured onto ice, and the crude oily product is washed with water by decantation and dissolved in a mixture of diethyl ether and benzene, containing a small amount of acetone. The organic solution is washed with water until neutral, dried over magnesium sulfate and evaporated to yield 36.5 g. of the α-(3,4-dimethoxy-phenyl)-phenylacetic acid amide which melts at 150–151° after recrystallization from a mixture of ethanol and diethyl ether; it analyzes as follows: Calcd. for $C_{16}H_{17}NO_3$: C, 70.83; H, 6.32; N, 5.16. Found: C, 71.20; H, 6.48; N, 5.10, and its infrared absorption spectrum (taken in mineral oil) shows peaks at $2.97\mu$, $3.15\mu$ and $6.07\mu$. It is further characterized by hydrolysis to the α-(3,4-dimethoxy-phenyl)phenylacetic acid, which melts at 96–98° after recrystallization from a mixture of diethyl ether and petroleum ether.

To a solution of 37.7 g. of α-(3,4-dimethoxy-phenyl)-phenylacetic acid amide in 2,000 ml. of toluene is added 165.0 g. of phosphorus pentoxide; the reaction mixture is refluxed for three hours while stirring, then cooled and treated with ice. After standing for some time, the organic layer is separated and the aqueous phase is extracted with diethyl ether; the organic solutions are combined, washed with an aqueous solution of sodium hydrogen carbonate and with water, dried over magnesium sulfate and evaporated. A total of 33.5 g. of the oily α-(3,4-dimethoxyphenyl)-phenylacetonitrile is obtained which is used without further purification; its infrared absorption spectrum (taken in mineral oil) shows a sharp peak at 4.44μ without any —NH— or amide-carbonyl bonds.

To a freshly prepared solution of 0.8 g. of sodium in 250 ml. of tertiary butanol is added at room temperature, 33.5 g. of α-(3,4-dimethoxy-phenyl)-phenylacetonitrile in 50 ml. of tertiary butanol and 50 ml. of tetrahydrofuran, followed by 10.3 g. of acrylonitrile. The reaction mixture warms to 34°, and after standing for 2½ hours, it is heated to 70° for 1¼ hours. The chilled solution is treated with dilute hydrochloric acid and ice, and the organic material is extracted with diethyl ether and separated. A crystalline precipitate forms which is filtered off; the organic filtrate is washed with several portions of water, dried over magnesium sulfate, concentrated to a volume of about 65 ml. and sealed with the above crystalline material. The desired α-(3,4-dimethoxy-phenyl)-α-phenyl-glutaronitrile precipitates (yield: 27.4 g.) and is recrystallized from methanol, M.P. 138.5–140° after drying. It analyzes as follows: Calcd. for $C_{19}H_{18}N_2O_2$: C, 74.49; H, 5.92; N, 9.15. Found: C, 74.39; H, 6.05; N, 8.93; and shows a moderately strong band at 4.43μ in the infrared absorption spectrum (taken in mineral oil).

A mixture of 27.4 g. of α-(3,4-dimethoxy-phenyl)-α-phenyl-glutaronitrile and 18.0 g. of potassium hydroxide in 220 ml. of water is refluxed while stirring for a total of 18 hours during the course of four days; overnight, it is left on the steam bath. The chilled reaction mixture is acidified with hydrochloric acid, whereupon a sticky precipitate is formed which is collected, washed with water, and dissolved in diethyl ether. The organic solution is washed with water, dried over magnesium sulfate and evaporated and the residue (yield 26.0 g.) covered with diethyl ether. The desired α-(3,4-dimethoxy-phenyl)-α-phenyl-glutaric acid does not crystallize and is used without further purification.

A solution of 22.0 g. of α-(3,4-dimethoxy-phenyl)-α-phenyl-glutaric acid in 120 ml. of acetic acid anhydride is refluxed for 45 minutes, and the excess of reagent is evaporated. The resulting α-(3,4-dimethoxy-phenyl)-α-phenyl-glutaric acid anhydride crystallizes from diethyl ether and melts at 123–124° after recrystallization from a mixture of ethyl acetate and diethyl ether. It analyzes as follows: Calcd. for $C_{19}H_{18}O_5$: C, 69.92; H, 5.56. Found: C, 69.80; H, 5.65; and its infrared absorption spectrum (taken in mineral oil) shows sharp peaks at 5.53μ and 5.66μ.

A total of 13.0 g. of α-(3,4-dimethoxy-phenyl)-α-phenyl-glutaric acid anhydride is dissolved in 130 ml. of boron trifluoride-acetic acid complex (glacial acetic acid saturated with boron trifluoride at room temperature) while stirring; the red solution is allowed to stand overnight at room temperature and is then poured into a solution of about 160 g. of sodium acetate in 800 ml. of water. The clear solution is chilled, acidified with a 1:1-mixture of concentrated hydrochloric acid and water, and the organic material is extracted with diethyl ether. The organic solution is washed with water, dried over magnesium sulfate and evaporated to yield 13.0 g. of the yellow oily 6,7-dimethoxy-4-phenyl-1,2,3,4-tetrahydro-naphthalen-1-one 4-carboxylic acid, which is used without further purification. Its 2,4-dinitro-phenyl-hydrazone melts at 166–169° after recrystallization from a mixture of ethanol and ethyl acetate; it analyzes as follows: Calcd. for $C_{25}H_{24}N_4O_9$: C, 57.25; H, 4.61; N, 10.68. Found: C, 58.73; H, 5.14; N, 10.33; and its infrared absorption spectrum (taken in mineral oil) shows peaks at 5.91μ, 6.18μ and 6.27μ.

A solution of 13.5 g. of 6,7-dimethoxy-4-phenyl-1,2,3,4-tetrahydro-naphthalen-1-one 4-carboxylic acid in 35 ml. of concentrated sulfuric acid and 5 ml. of 30% fuming sulfuric acid in 1,000 ml. of ethanol is refluxed for 2½ days; towards the end of the reaction, the excess of ethanol is allowed to evaporate. The remaining solution is treated with ice and then extracted with diethyl ether; the organic solution is washed with water and an aqueous solution of sodium hydrogen carbonate, dried over magnesium sulfate and evaporated. The resulting crystalline ethyl 6,7-dimethoxy-4-phenyl-1,2,3,4-tetrahydro-naphthalen-1-one 4-carboxylate (yield: 11.1 g.) is recrystallized from ethanol, M.P. 147–149° It analyzes as follows: Calcd. for $C_{21}H_{22}O_5$: C, 71.17; H, 6.26. Found: C, 70.72; H, 6.30. Its infrared absorption spectrum (taken in mineral oil) shows peaks at 5.78μ, 5.96μ and 14.3μ, and its ultraviolet absorption spectrum (taken in methanol) shows $\lambda_{max.}$ at 237 mμ (ε=23,190), 277 mμ (ε=11,110) and 312 mμ (ε=7020).

To a solution of 25.0 g. of hydroxylamine hydrochloride and 10.0 g. of sodium hydroxide in 360 ml. of water and 400 ml. of ethanol, prepared in the cold, is added 9.5 g. of ethyl 6,7-dimethoxy-4-phenyl-1,2,3,4-tetrahydro-naphthalen-1-one 4-carboxylate, and the reaction mixture is refluxed for three hours. After chilling, the latter is seeded with a crystalline sample (obtained by extracting a small portion of the reaction mixture with diethyl ether, washing the organic solution with water, drying it over magnesium sulfate and evaporating it, and crystallizing the residue from a mixture of diethyl ether and petroleum ether), and the ethyl 6,7-dimethoxy-1-hydroxyimino-4-phenyl-1,2,3,4-tetrahydro-naphthalene 4-carboxylate crystallizes and is washed with aqueous ethanol (yield: 9.0 g.). It melts at 148–149° after recrystallization from a mixture of diethyl ether and petroleum ether, analyzes as follows: Calcd. for $C_{21}H_{23}NO_5$: C, 68.28; H, 6.28; N, 3.79. Found: C, 68.08; H, 6.13; N, 3.84; and its infrared absorption spectrum (taken in mineral oil) shows a broad —OH band, a weak —C=N— band, and a peak at 5.77μ, whereas the ultraviolet absorption spectrum (taken in ethanol) shows $\lambda_{max.}$ at 212 mμ (ε=28,760), 269 mμ (ε=15,750) and 303 mμ (ε=6,270), and a shoulder at 313 mμ (ε=5,210).

A solution of 9.1 g. of ethyl 6,7-dimethoxy-1-hydroxyimino-4-phenyl-1,2,3,4-tetrahydro-naphthalene 4-carboxylate in 300 ml. of ethanol containing 10.0 g. of Raney nickel is treated at room temperature with hydrogen having an initial pressure of about 3½ atmospheres. After the hydrogenation is complete (1½ hours), the reaction mixture is filtered, the filtrate is evaporated and the residue, containing the mixture of the cis- and the trans-ethyl 1-amino-6,7-dimethoxy-4-phenyl-1,2,3,4-tetrahydro-naphthalene 4-carboxylate, is heated on the steam bath in the absence of any diluent. On cooling, the material solidifies and is triturated with diethyl ether to yield 1.1 g. of the 6,7-dimethoxy-4-phenyl-1,2,3,4-tetrahydro-1,4-ethano-isoquinolin-3-one, which melts at 236–237° after recrystallization from a mixture of ethanol and methanol and analyzes as follows: Calcd. for $C_{19}H_{19}NO_3$: C, 73.76; H, 6.19; N, 4.53. Found: C, 73.32; H, 6.32; N, 4.62. Its infrared absorption spectrum (taken in mineral oil) shows the —NH— bond and a strong peak at 5.98μ, whereas its ultraviolet absorption spectrum (taken in ethanol) shows $\lambda_{max.}$ at 241 mμ (ε=3,980) and 285 mμ (ε=3,810).

The above diethyl ether washing, upon dilution with petroleum ether, yields 1.9 g. of an acid-soluble crystalline material, which is heated on the steam bath, but is not transformed into the desired 6,7-dimethoxyl-4-phenyl-1,2,3,4-tetrahydro-1,4-ethano-isoquinolin-3-one. It represents the trans-ethyl 1-amino-6,7-dimethoxy-4-phenyl-1,2,3,4-tetrahydro-naphthalene 4-carboxylate, M.P. 139–

141° after recrystallization from a mixture of methanol and diethyl ether; its hydrochloride salt melts at 244–245° (with decomposition).

A mixture of 0.8 g. of 6,7-dimethoxy-4-phenyl-1,2,3,4-tetrahydro-1,4-ethano-isoquinolin-3-one in 150 ml. of toluene is treated with 0.25 g. of a 56 percent mineral oil suspension of sodium hydride and then with 15 ml. of methyl iodide. The reaction mixture is stirred and refluxed for seven hours, then cooled and cautiously treated with water. The organic layer is diluted with diethyl ether, washed with water, dried over magnesium sulfate and evaporated. The residue is triturated with diethyl ether to yield 0.73 g. of 6,7-dimethoxy-2-methyl-4-phenyl-1,2,3,4-tetrahydro-1,4-ethano-isoquinolin-3-one of the formula

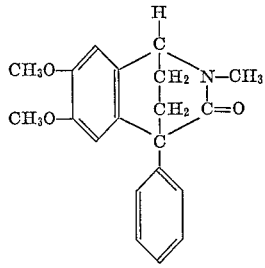

which melts at 200–202° and the melting point is not altered after recrystallization from a mixture of methanol and diethyl ether. It analyzes as follows: Calcd. for $C_{20}H_{21}NO_3$: C, 74.28; H, 6.55; N, 4.33. Found: C, 74.42; H, 6.76; N, 4.42; and its infrared absorption spectrum (taken in mineral oil) shows a peak at 5.99µ and no —NH— bonds.

A solution of 0.6 g. of 6.7-dimethoxy-2-methyl-4-phenyl-1,2,3,4-tetrahydro-1,4-ethano-isoquinolin-3-one in 100 ml. of benzene is treated with 25 ml. of a 1.92 molar solution of methyl lithium in diethyl ether. After heating to reflux for 50 minutes, the cooled reaction mixture is poured onto ice and diluted with diethyl ether. The organic solution is washed twice with water and is then extracted with about 75 ml. of a 1:1-mixture of concentrated hydrochloric acid and water. The chilled acidic extract is treated gradually with a cold concentrated aqueous solution of sodium hydroxide. The yellow oily base, representing the 6,7-dimethoxy-2-methyl-3-methylene-4-phenyl-1,2,3,4-tetrahydro-1,4-ethano-isoquinoline of the formula

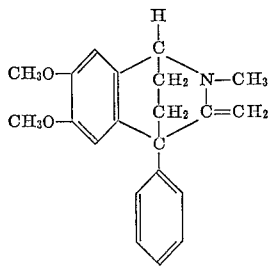

is extracted with diethyl ether; the organic solution is washed with diethyl ether; the organic solution is washed with water, dried over potassium carbonate, concentrated to a volume of about 100 ml. and used without further purification.

Example 22

A diethyl ether solution of about 1.8 g. of 4-(4-fluorophenyl)-2-methyl-3-methylene-1,2,3,4-tetrahydro-1,4-ethano-isoquinoline (dried over potassium carbonate, is treated with a slight excess of about 15 percent solution of hydrogen iodide in aqueous ethanol. The resulting precipitate is filtered off, and washed with diethyl ether to yield the yellowish 4-(4-fluorophenyl)-2,3-dimethyl-1,4-dihydro-1,4-ethano-isoquinolinium iodide of the formula

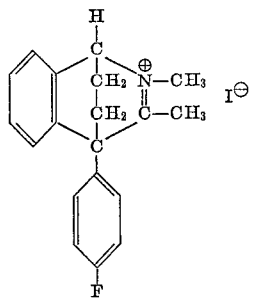

which melts at 277–278° (with decomposition) after recrystallization from ethanol. It analyzes as follows: Calcd. for $C_{19}H_{19}FIN$: C, 56.03; H, 4.70; N, 3.44. Found: C, 56.15; H, 4.89; N, 3.47; and its infrared absorption spectrum (taken in mineral oil) shows strong peaks at 6.03µ, and 6.20µ, and its ultraviolet absorption spectrum (taken in methanol) shows strong end absorption and $\lambda_{max.}$ at 252–262 mµ ($\epsilon$=1,050) and 268 mµ ($\epsilon$=850).

The starting material used in the above reaction is prepared as follows: At a temperature of 72–110°, 236 g. of phenylacetonitrile is treated over a period of one hour with 334 g. of bromine. After stirring for an additional 45 minutes, heating at 110° for 15 minutes and standing for one hour, the reaction mixture is evaporated and the resulting crude α-broma-phenylacetonitrile is mixed with 100 g. of fluorobenzene. The resulting mixture is added over a period of two hours to a stirred suspension of 294 g. of anhydrous aluminum chloride in 300 g. of fluoro benzene while stirring and keeping the temperature at 40–50° by external cooling. After the addition is complete, the reaction mixture is warmed to 50° for an additional hour, left at room temperature overnight, and poured over a mixture of ice and an excess of hydrochloric acid. The organic material is extracted with diethyl ether, and the organic solution is washed twice with water, with an aqueous solution of sodium hydrogen carbonate and water, dried over magnesium sulfate and evaporated. The resulting α-(4-fluorophenyl)-phenylacetonitrile is purified by distillation and collected at 148–156°/1.7–2.0 mm.; yield: 289.2 g.

A solution of 289.0 g. of α-(4-fluoro-phenyl)-phenylacetonitrile in 500 ml. of tertiary butanol is treated with 41 ml. of a 40% benzyl-trimethyl-ammonium methoxide solution, then cooled to 17°, and reacted, over a period of 30 minutes, with 78.0 g. of acrylonitrile. After completion of the exothermic reaction, the red-brown solution is allowed to stand for 1½ hours and then poured over a mixture of ice and hydrochloric acid. The organic material is extracted with diethyl ether (an emulsion is broken with sodium chloride, and any polymeric material is filtered off); the organic solution is washed three times with water, then with aqueous sodium hydrogen carbonate and again with water, dried over magnesium sulfate and evaporated to yield a dark-red oil. The latter crystallizes from a mixture of diethyl ether and petroleum ether to yield 129.0 g. of α-(4-fluoro-phenyl)-α-phenyl-glutaronitrile, which melts at 82–84° after recrystallization from diethyl ether; it analyzes as follows: Calcd. for $C_{17}H_{13}FN_2$: C, 77.25; H, 4.96; N, 10.60. Found: C, 77.37; H, 4.91; N, 10.52; and its infrared absorption spectrum (taken in mineral oil) shows a peak at 4.42µ.

A solution of 129.0 g. of α-(4-fluoro-phenyl)-α-phenyl-glutaronitrile in 700 ml. of glacial acetic acid and 500 ml. of concentrated hydrochloric acid is refluxed for 5½ hours and allowed to stand overnight. About 500 ml. of the volatile diluent of the reaction mixture is evaporated under reduced pressure; the residue is cooled, diluted with ice-water and filtered. The solid α-(4-fluoro-phenyl)-α-phenyl-glutaric acid imide is filtered off, washed with water and diethyl ether; it melts at 197–199° after recrystallization from a mixture of acetone and methanol and analyzes as follows: Calcd. for $C_{17}H_{16}FNO$: C, 72.07; H, 4.98; N, 4.95. Found: C, 71.92; H, 5.02; N, 4.86. Its infrared absorption spectrum (taken in mineral oil) shows peaks at $3.14\mu$ and $3.24\mu$, and a doublet at $5.84$–$5.91\mu$.

A mixture of 138.0 g. of α-(4-fluoro-phenyl)-α-phenyl-glutaric acid imide and a solution of 540.0 g. of potassium hydroxide in 1,000 ml. of water is refluxed for a total of 19 hours over a period of three days while stirring, and being left on the steam bath during the night periods. After no ammonia evolution can be observed, the reaction mixture is chilled, diluted with water and acidified with hydrochloric acid. The resulting precipitate is filtered off, washed with water and dissolved in diethyl ether. The organic solution is washed with water, dried over magnesium sulfate and evaporated. The crude α-(4-fluoro-phenyl)-α-phenyl-glutaric acid crystallizes in the presence of a small amount of diethyl ether and melts at 177–178° after recrystallization from diethyl ether. It analyzes as follows: Calcd. for $C_{17}H_{15}FO_4$: C, 67.54; H, 5.00. Found: C, 67.67; H, 5.12; and its infrared absorption spectrum (taken in mineral oil) shows bonded —OH peaks and ionic bands, and a doublet at $5.82$–$5.90\mu$.

A solution of 96.5 g. of α-(4-fluoro-phenyl)-α-phenyl-glutaric acid in 1,800 ml. of concentrated sulfuric acid, prepared at room temperature, is allowed to stand 2½ hours, then poured over ice. The sticky organic material is extracted with diethyl ether; the organic solution is washed with water until neutral, dried over magnesium sulfate and evaporated. The residue is triturated with diethyl ether to yield 32.9 g. of the crystalline 4-(4-fluoro-phenyl)-1,2,3,4-tetrahydro-naphthalen-1-one 4-carboxylic acid which melts at 158–159° after recrystallization from diethyl ether. It analyzes as follows: Calcd. for $C_{17}H_{13}FO_3$: C, 71.82; H, 4.61. Found: C, 71.78; H, 4.85; and its infrared absorption spectrum (taken in mineral oil) shows a bonded —OH band and peak at $5.79\mu$ and $6.05\mu$, whereas its ultraviolet absorption spectrum (taken in ethanol) shows $\lambda_{max}$. 207 m$\mu$ ($\epsilon$=29,040), 248 m$\mu$ ($\epsilon$=11,180) and 292–294 m$\mu$ ($\epsilon$=1,900).

A mixture of 35.2 g. of 4-(4-fluoro-phenyl)-1,2,3,4-tetrahydro-naphthalen-1-one 4-carboxylic acid and a pre-prepared solution of 73.5 ml. of concentrated sulfuric acid and 10.5 ml. of 30% fuming sulfuric acid in 2,100 ml. of absolute ethanol is refluxed for three days. Most of the excess of ethanol is evaporated under reduced pressure; the residue is poured onto ice and the organic material is extracted with diethyl ether. The organic solution is washed with water, with aqueous sodium hydrogen carbonate and water, dried over magnesium sulfate, and evaporated. The residue is crystallized in diethyl ether to yield 29.1 g. of ethyl 4-(4-fluoro-phenyl)-1,2,3,4-tetrahydro-naphthalen-1-one 4-carboxylate, which melts at 112–113° after recrystallization from diethyl ether. It analyzes as follows: Calcd. for $C_{19}H_{17}FO_3$: C, 73.06; H, 5.49. Found: C, 72.82; H, 5.40. Its infrared absorption spectrum (taken in mineral oil) shows peaks at 5.80 m$\mu$ and 5.97 m$\mu$ (the peak at about 14.3 m$\mu$, representing a mono-substituted phenyl group and present before cyclization, is now absent; the cyclization occurs to the phenyl group), and its ultraviolet absorption spectrum (taken in ethanol) shows $\lambda_{max}$. at 248 m$\mu$ ($\epsilon$=11,660) and 290–294 m$\mu$ ($\epsilon$=1,890) and an inflexion at 271 m$\mu$ ($\epsilon$=1,900).

A mixture of 29.1 g. of ethyl 4-(4-fluoro-phenyl)-1,2,3,4-tetrahydro-naphthalen-1-one 4-carboxylate and a solution of 75.0 g. of hydroxylamine hydrochloride and 30.0 g. of sodium hydroxide in 650 ml. of a 1:1-mixture of ethanol and water is refluxed for three hours, and then allowed to stand overnight. The organic material is extracted with diethyl ether; the organic solution is washed with water, dried over magnesium sulfate and evaporated to yield 30.0 g. of the oily ethyl 4-(4-fluoro-phenyl)-1-hydroxyimino-1,2,3,4-tetrahydro-naphthalene 4-carboxylate. It crystallizes from ethanol and melts at 96–98° after recrystallization from ethanol; it analyzes as follows: Calcd. for $C_{19}H_{18}FNO_3$: C, 69.71; H, 5.54; N, 4.28. Found: C, 69.79; H, 5.68; N, 4.18; and its infrared absorption spectrum (taken in mineral oil) shows a broad —OH band, a weak —C=N— shoulder and a peak at $5.79\mu$, whereas its ultraviolet absorption spectrum (taken in ethanol) shows $\lambda_{max}$. ($\epsilon$=24,610), 258 m$\mu$ ($\epsilon$=13,170) and 298 m$\mu$ ($\epsilon$=610).

A solution of 28.0 g. of ethyl 4-(4-fluoro-phenyl)-1-hydroxyimino - 1,2,3,4-tetrahydro - naphthalene 4 - carboxylate in 300 ml. of ethanol containing about 30 g. of Raney nickel is treated with hydrogen (initial pressure: about 3½ atmospheres). After one-half hour, the theoretical amount of hydrogen has been absorbed; the reaction mixture is filtered, and the filtrate is evaporated to yield the mixture of cis- and trans-ethyl 1-amino-4-(4-fluoro-phenyl) - 1,2,3,4 - tetrahydro - naphthalene 4-carboxylate, which is heated on the steam bath overnight. The crystalline material is removed by trituration with a mixture of ethanol and diethyl ether; it represents the 4-(4-fluoro-phenyl) - 1,2,3,4 - tetrahydro - naphthalene 4 - carboxylate 3-one, which melts at 291–293° after recrystallization from ethanol; yield: 5.4 g. An additional 3.8 g. of the desired product is obtained from the mother liquors by re-heating the residue on the steam bath. It analyzes as follows: Calcd. for $C_{17}H_{14}FNO$: C, 76.39; H, 5.28; N, 5.24. Found: C, 76.15; H, 5.28; N, 5.02; and its infrared absorption spectrum (taken in mineral oil) shows peaks at $3.15\mu$, $3.28\mu$ and $6.02\mu$.

To a solution of 2.5 g. of 4-(4-fluoro-phenyl)-1,2,3,4-tetrahydro-1,4-ethano-isoquinolin-3-one in 250 ml. of toluene are added 1.0 g. of a 56% suspension of sodium hydride in mineral oil and 20 ml. of methyl iodide. After refluxing and stirring for a total of 13 hours, the cooled reaction mixture is diluted with diethyl ester and treated with water; the organic layer is washed with water until neutral, dried over magnesium sulfate and evaporated to yield the crystalline 4-(4-fluoro-phenyl)-2-methyl-1,2,3,4-tetrahydro - 1,4 - ethano - isoquinolin - 3 - one of the formula

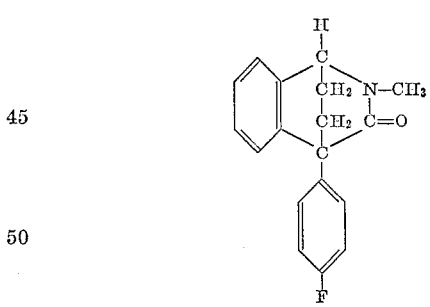

which melts at 229–231° after washing with diethyl ether and recrystallizing from a mixture of methanol and ethanol. It analyzes as follows: Calcd. for $C_{18}H_{16}FNO$: C, 76.84; H, 5.73; N, 4.98. Found: C, 77.06; H, 5.87; N, 5.06; and its infrared absorption spectrum (taken in mineral oil) shows a sharp peak at 6.03, without any —NH— band.

A solution of 2.2 g. of 4-(4-fluoro-phenyl)-2-methyl-1,2,3,4-tetrahydro-1,4-ethano-isoquinolin-3-one in 160 ml. of benzene is treated with 25 ml. of a 1.92 molar solution of methyl lithium in diethyl ether. After standing overnight, the reaction mixture is refluxed for 45 minutes, cooled and poured onto a mixture of ice and water. The organic material is extracted with diethyl ether, the organic solution is washed with water and then extracted with 80 ml. of a 1:1-mixture of concentrated hydrochloric acid and water. The aqueous extract is chilled in ice, and made basic by slowly adding concentrated aqueous sodium hydroxide; the 4-(4 - fluoro - phenyl) - 2 - methyl - 3 - methylene - 1,2,3,4 - tetrahydro - 1,4 - ethano - isoquinoline of the formula

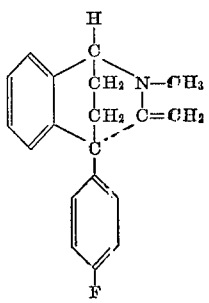

precipitates as an oil, which crystallizes on scratching and cooling (yield: 2 g.). It melts at 146–148° after washing with water and recrystallizing from diethyl ether, analyzes as follows: Calcd. for $C_{19}H_{18}IN$: C, 81.69; H, 6.49; N, 5.02. Found: C, 81.72; H, 6.48; N, 4.92; and its infrared absorption spectrum (taken in mineral oil) shows a sharp peak at $5.15\mu$ and a lesser peak at $6.21\mu$, whereas its ultraviolet absorption spectrum (taken in methanol) shows $\lambda_{max}$ at 230 m$\mu$ ($\epsilon$=4,860), and points of inflexion at 263 m$\mu$ ($\epsilon$=2,380) and 269 m$\mu$ ($\epsilon$=1,910).

Example 23

A slight excess of an about 5 percent aqueous alcoholic solution of hydrogen iodide is added to a diethyl ether solution of 4 - (3 - hydroxy - 3 - methyl - butyl) - 2-methyl - 3 - methylene - 1,2,3,4 - tetrahydro - 1,4 - ethano-isoquinoline (prepared as described below). The crystalline precipitate is filtered off and recrystallized from a mixture of ethanol and diethyl ether to yield 1.8 g. of 2,3 - dimethyl - 4 - (3 - hydroxy - 3 - methyl - butyl) - 1,4-dihydro - 1,4 - ethano - isoquinolinium iodide of the formula

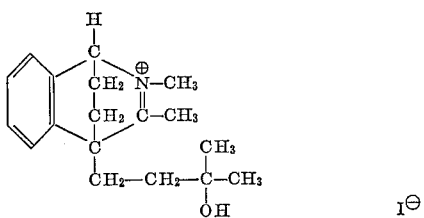

which melts at 188.5–190° (with decomposition). It analyzes as follows: Calcd. for $C_{18}H_{26}INO$: C, 54.14; H, 6.56; N, 3.51. Found: C, 54.34; H, 6.69; N, 3.48. Its infrared absorption spectrum (taken in mineral oil) shows a peak at $6.10\mu$ and a hydroxyl band at $3.03\mu$, and its ultraviolet absorption spectrum (taken in methanol) shows $\lambda_{max}$ at 219–220 m$\mu$ ($\epsilon$=15,310) and 255–261 m$\mu$ ($\epsilon$=880).

The starting material used in the above procedure is prepared as follows: A solution of 117.0 g. of phenyl-acetonitrile in 350 ml. of tertiary butanol is treated with a 40 percent of a benzyl-trimethyl-ammonium methoxide solution and then with 87.5 g. of methylacrylate, added over a period of six minutes; during the addition, the temperature rises to 67°. The reaction mixture is allowed to stand for one hour, acidified while cooled, diluted with water and extracted with diethyl ether. The organic solution is washed with water and evaporated. The resulting oily dimethyl 4-cyano-4-phenyl-pimelate is used without further purification. It is refluxed in 1,000 ml. of a 10 percent aqueous solution of sodium hydroxide in water for 3¾ hours, then cooled, acidified, and the organic material is extracted with diethyl ether. The organic solution is washed with water, dried over magnesium sulfate and evaporated to yield 158.0 g. of an oily product which crystallizes partially from diethyl ether to yield 27.5 g. of α-(2-carboxy-ethyl)-α-phenyl-glutaric acid imide. It melts at 172.5–174° after recrystallization from diethyl ether and analyzes as follows: Calcd. for $C_{14}H_{15}NO_4$: C, 64.36; H, 5.79; N, 5.36. Found: C, 64.38; H, 6.00; N, 5.36. Its infrared absorption spectrum (taken in mineral oil) shows a peak at $5.78\mu$. From the mother liquors, 10.0 g. of the 4-carboxy-4-phenyl-pimelic acid is obtained, which melts at 156–157° after recrystallization from a mixture of methanol and diethyl ether.

A mixture of 33.5 g. of α-(2-carboxyethyl)-α-phenyl-glutaric acid imide and 85 ml. of concentrated sulfuric acid is warmed gently on the steam bath for 1¼ hours. After cooling, the reaction mixture is treated with the ice to yield 29.0 g. of the crystalline 1, 2', 6'-trioxo-1,2,3,4-tetrahydro-spiro[naphthalene-4,3'-piperidine], which is collected, washed with water and air-dried, M.P. 201–203°.

A mixture of 29.0 g. of 1,2',6'-trioxo-1,2,3,4-tetrahydro-spiro[naphthalene-4,3'-piperidine] and a solution of 15.0 g. of sodium hydroxide in 70 ml. of water is refluxed for four hours. The resulting solution is chilled, diluted with water and acidified with hydrochloric acid. The oily organic material is extracted with diethyl ether; the organic solution is washed with water, dried over magnesium sulfate and evaporated to yield 24.0 g. of 4-carboxy-4-(2-carboxyethyl)-1,2,3,4-tetrahydro-naphthalene - 1 - one, which melts at 171–172° and is used without further purification. Its 2,4-dinitro-phenyl-hydrazone derivative melts at about 145°.

A mixture of 24.0 g. of 4-carboxy-4-(2-carboxyethyl)-1,2,3,4-tetrahydro-naphthalene-1-one and a solution of 36 ml. of concentrated sulfuric acid and 4.8 ml. of 30 percent oleum in 1,000 ml. of absolute ethanol is refluxed for two days. The major portion of ethanol is allowed to evaporate and the acid solution is poured over ice; the oily material is extracted with diethyl ether. The organic solution is washed with dilute aqueous sodium hydroxide and water, dried over magnesium sulfate and evaporated to yield 26.5 g. of the crude 4-carbethoxy-4-(2-carbethoxyethyl)-1,2,3,4-tetrahydro - naphthalen - 1-one which is used without purification.

A mixture of 26.5 g. of 4-carbethoxy-4-(2-carbethoxyethyl)-1,2,3,4-tetrahydro-naphthalen-1-one and a solution of 66.5 g. of hydroxylamine hydrochloride and 26.5 g. of sodium hydroxide in 200 ml. of water and 250 ml. of ethanol is refluxed for three hours. An oily product separates upon cooling, which is extracted with diethyl ether; the organic solution is washed with water, dried with magnesium sulfate and evaporated to yield 24.5 g. of the oily 4-carbethoxy-4-(2-carbethoxyethyl)-1-hydroxyimino-1,2,3,4-tetrahydro-naphthalene which is used without further purification.

A solution of 24.5 g. of 4-carbethoxy-4-(2-carbethoxyethyl)-1-hydroxyimino-1,2,3,4-tetrahydro-naphthalene in 300 ml. of ethanol containing 10.0 g. of Raney nickel is treated at room temperature with hydrogen at an initial pressure of about 3½ atmospheres. The reaction is interrupted after one hour, the catalyst is filtered off, the filtrate is evaporated to yield 24.0 g. of the crude mixture of cis- and trans-1-amino-4-carbethoxy-4-(2-carbethoxyethyl)-1,2,3,4-tetrahydro-naphthalene which is used without further purification by heating it on the steam bath for four days. The resulting product is triturated with diethyl ether to yield 6.0 g. of the crystalline 4-(2-carbethoxyethyl)-1,2,3,4-tetrahydro - 1,4 - ethano-isoquinolin-3-one, which melts at 123–124° after recrystallization from diethyl ether. It analyzes as follows: Calcd. for $C_{16}H_{19}NO_3$: C, 70.31; H, 7.01; N, 5.13. Found: C, 70.08; H, 7.07; N, 5.03. and its infrared absorption spectrum (taken in mineral oil) shows an —NH— band at $3.13\mu$, and peaks at $5.75\mu$ and $5.98\mu$.

A solution of 4.9 g. of 4-(2-carbethoxyethyl)-1,2,3,4-tetrahydro-1,4-ethano-isoquinolin-3-one in 300 ml. of toluene is treated with 3.0 g. of a 56 percent suspension of sodium hydride in mineral oil and then with 25 ml. of methyl iodide. The resulting suspension is refluxed for 7¼ hours while stirring and allowed to stand at 2½ days;

after cooling, the reaction mixture is treated with ice and water and diluted with benzene and diethyl ether. The separated organic layer is washed several times over water, dried over magnesium sulfate, and evaporated to yield 4.7 g. of the oily 4-(2-carbethoxyethyl)-2-methyl-1,2,3,4-tetrahydro - 1,4 - ethano-isoquinolin-3-one of the formula

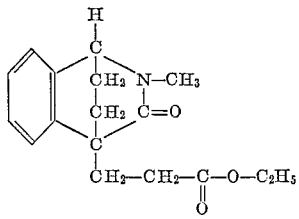

which does not crystallize and used without further purification.

A solution of 4.5 g. of 4-(2-carbethoxyethyl)-2-methyl-1,2,3,4-tetrahydro-1,4-ethano-isoquinolin-3-one in 100 ml. of a 1.92 molar solution of methyl lithium in diethyl ether, and refluxed for 6½ hours and then allowed to stand overnight. After pouring over ice, the organic material is extracted with diethyl ether, and the organic solution is washed with water, then with several portions of a cold 1:1-mixture of concentrated hydrochloric acid and water, totalling about 75 ml. The acidic extract is chilled and gradually treated with a cold solution of sodium hydroxide in water; the resulting 4-(3-hydroxy-3-methyl-butyl)-2-methyl - 3 - methylene - 1,2,3,4 - tetrahydro-1,4-ethano-isoquinoline of the formula

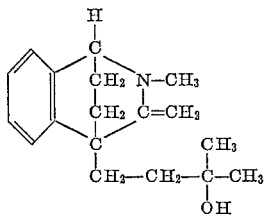

is extracted with diethyl ether, and the resulting solution is washed several times with water, then dried over potassium carbonate and used without further purification.

Example 24

A diethyl ether solution of 2-benzyl-4-methyl-3-methylene-1,2,3,4-tetrahydro-1,4-ethano-isoquinoline (prepared as described below) is treated with an excess of a saturated solution of hydrogen bromide in ethanol. The oily precipitate is washed with diethyl ether by decantation and crystallized from a mixture of diethyl ether and ethanol (yield: 0.5 g.) to yield the 2-benzyl-3,4-dimethyl-1,4-dihydro-1,4-ethano-isoquinolinium bromide, which melts at 233–235° (with decomposition).

The starting material used in the above example is prepared as follows: To a chilled suspension of 43.0 g. of sodium amide in 1,300 ml. of benzene are added while stirring 115 ml. of phenyl acetonitrile and, after twenty minutes, 68.6 ml. of methyl iodide over a period of fifteen minutes. The reaction mixture is stirred for an additional fifteen minutes while cooling and without cooling for six hours; after standing overnight at room temperature, it is treated with water, and diluted with diethyl ether. The organic phase is washed with several portions of water, dried over magnesium sulfate, and evaporated to yield 112.0 g. of the oily 2-phenyl-propionitrile, which is used without further purification.

To a solution of 112.0 g. of 2-phenyl-propionitrile in 350 ml. of tertiary butanol and 15 ml. of a 40 percent solution of benzyl-trimethyl-ammonium methoxide is added over a period of five minutes 93 ml. of methyl acrylate, whereby the temperature rises to 43°. The reaction mixture is allowed to stand for one hour and then warmed to 65° and again allowed to stand for 2¾ hours until the temperature reaches 29°; it is then poured over a mixture of ice and hydrochloric acid and the resulting oily product is extracted with diethyl ether. The organic solution is washed with water, dried over magnesium sulfate and evaporated to yield 148.0 g. of the oily methyl 4-cyano-4-phenyl-valerate, which is used without further purification.

A mixture of 148 g. of methyl 4-cyano-4-phenyl-valerate and a solution of 700 g. of 86 percent potassium hydroxide in 1,300 ml. of water is refluxed while stirring for 14 hours and acidified with hydrochloric acid. The oily material is extracted with diethyl ether; the organic phase is washed three times with water, dried over magnesium sulfate and evaporated to yield 161.0 g. of α-methyl-α-phenyl-glutaric acid which crystallizes partially and is used without further purification. A sample obtained by hydrolysis of the anhydride (see below) melts at 132–134° after recrystallization from a mixture of diethyl ether and petroleum ether, and analyzes as follows: Calcd. for $C_{12}H_{14}O_4$: C, 64.85; H, 6.35. Found: C, 65.61; H, 6.44. Its infrared absorption spectrum (taken in mineral oil) shows a peak at 5.91μ.

A solution of 41.2 g. of the crude α-methyl-α-phenyl-glutaric acid in 100 ml. of acetic acid anhydride is refluxed for 1¼ hours; the excess of reagent is evaporated under reduced pressure and the resulting α-methyl-α-phenyl-glutaric acid anhydride is purified by distillation. It is collected at 163–166°/1.4–1.5 mm.; yield: 18.0 g., and crystallizes from a mixture of diethyl ether and ethyl acetate; it melts at 81–82° after recrystallization from the same solvent mixture and analyzes as follows: Calcd. for $C_{12}H_{12}O_3$: C, 70.57; H, 5.92. Found: C, 70.60; H, 5.78. Its infrared absorption spectrum (taken in mineral oil) shows the twin peaks at 5.55μ and 5.68μ.

A solution of 53.5 g. of α-methyl-α-phenyl-glutaric acid anhydride in 1,000 ml. of concentrated sulfuric acid and is allowed to stand at room temperature for three hours and then poured over ice. The organic material is extracted with diethyl ether and the organic phase is washed several times with water, dried over magnesium sulfate and evaporated. The residue crystallizes after trituration with a mixture of diethyl ether and petroleum ether (yield: 35.8 g.) to yield the 4-methyl-1,2,3,4-tetrahydro-naphthalen-1-one 4-carboxylic acid, which melts at 123–124° after recrystallization from the same solvent mixture and analyzes as follows: Calcd. for $C_{12}H_{12}O_3$: C, 70.57; H, 5.92. Found: C, 70.69; H, 5.89. Its infrared absorption spectrum (taken in mineral oil) shows bands at 5.80μ, 5.87μ, 5.92μ (multiplet) and 6.03μ, and the ultraviolet absorption spectrum (taken in methanol) shows $\lambda_{max.}$ at 205 mμ (ε=22,480), 249 mμ (ε=11,100) and 290 mμ (ε=1,560) and a shoulder at 296 mμ (ε=1,510).

A mixture of 39.4 g. of 4-methyl-1,2,3,4-tetrahydro-naphthalen-1-one 4-carboxylic acid and a solution of 70 ml. of concentrated sulfuric acid and 10 ml. of 30 percent oleum in 2,000 ml. of ethanol is refluxed for four days; the organic solvent is removed under reduced pressure, and the residue is treated with ice and water. The organic material is extracted with diethyl ether; the organic solution is washed with water and aqueous sodium hydrogen carbonate, dried over magnesium sulfate, and evaporated to yield 40.0 g. of the oily ethyl 4-methyl-1,2,3,4-tetrahydro-naphthalen-1-one 4-carboxylate.

A mixture of 40.0 g. of ethyl 4-methyl-1,2,3,4-tetrahydro-naphthalen-1-one 4-carboxylate and a solution of 100 g. of hydroxylamine hydrochloride and 40.0 g. of sodium hydroxide in 600 ml. of a 1:1 mixture of ethanol and water is refluxed for three hours. Upon cooling and diluting the reaction mixture with water, the organic material is extracted with diethyl ether, and the organic solution is washed three times with water, dried over magnesium sulfate and evaporated to yield 38.5 g. of ethyl 1-hydroxyimino-4-methyl - 1,2,3,4-tetrahydro-naphthalene 4-carboxylate, which fails to crystallize and is used without further purification.

A solution of 30.0 g. of ethyl 1-hydroxyimino-4-methyl-1,2,3,4-tetrahydro-naphthalene 4-carboxylate in 300 ml. of ethanol containing 25 g. of Raney nickel is treated at room temperature with hydrogen at an initial pressure of about 3½ atmospheres. The hydrogenation is interrupted after 45 minutes; the reaction mixture is filtered and the filtrate is evaporated under reduced pressure to yield the mixture of the cis- and the trans-ethyl 1-amino-4 - methyl-1,2,3,4-tetrahydro-naphthalene 4 - carboxylate, which is heated on the steam bath for four days. After several triturations of the resulting product with a mixture of ethanol and diethyl ether, a total of 9.1 g. of 4-methyl-1,2,3,4 - tetrahydro - 1,4 - ethano - isoquinolin - 3 - one is obtained, which melts at 165–166° after recrystallization from a mixture of methanol and diethyl ether. It analyzes as follows: Calcd. for $C_{12}H_{13}NO$: C, 76.97; H, 7.00; N, 7.48. Found: C, 77.00; H, 6.99; N, 7.43; and its infrared absorption spectrum (taken in mineral oil) shows —NH— band at $3.13\mu$ (shouldered at $3.3\mu$) and a peak at $5.98$–$6.06\mu$.

A solution of 6.0 g. of 4-methyl-1,2,3,4-tetrahydro-1,4-ethano-isoquinolin-3-one in 400 ml. of toluene is treated with 3.0 g. of a 56 percent suspension of sodium hydride in mineral oil and then with 7.5 ml. of benzyl bromide, refluxed for seven hours and then allowed to stand overnight. It is diluted with water and diethyl ether; the organic phase is washed with water, dried over magnesium sulfate, and evaporated to yield 2-benzyl-4-methyl-1,2,3,4-tetrahydro-1,4-ethano-isoquinolin-3-one of the formula

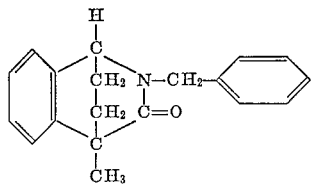

which does not crystallize and is used without further purification.

A solution of the above 2-benzyl-4-methyl-1,2,3,4-tetrahydro-1,4-ethano-isoquinolin-3-one in 50 ml. of benzene is treated with 15 ml. of a 1.92 molar solution of methyl lithium in diethyl ether and then refluxed for ten minutes. The reaction mixture is allowed to stand overnight at room temperature, then poured onto ice and diluted with diethyl ether. The organic phase is washed three times with water, and extracted with several portions of a 1:1 mixture of concentrated hydrochloric acid and water (about 75 ml.); the acidic extract is made basic with a cold concentrated aqueous solution of sodium hydroxide, added gradually. The oily 2-benzyl-4-methyl-3-methylene-1,2,3,4-tetrahydro-1,4-ethano-isoquinoline of the formula

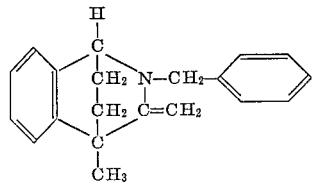

is extracted with diethyl ether; the organic solution is washed with water, dried over potassium carbonate and evaporated to a volume of about 200 ml. In the following step, half of this solution is used as the starting material.

Example 25

The second half of the diethyl ether solution of 2-benzyl - 4 - methyl - 3 - methylene - 1,2,3,4 - tetrahydro-1,4-ethano-isoquinoline (as prepared according to the procedure described in Example 24) is treated with a slight excess of an about 15 percent solution of hydrogen iodide in aqueous ethanol. The oily precipitate is washed with diethyl ether and crystallized from ethanol to yield 0.8 g. of the 2-benzyl-3,4-dimethyl-1,4-dihydro-1,4-ethano-isoquinolinium iodide, which melts at 215–216° (with decomposition). It analyzes as follows: Calcd. for $C_{20}H_{22}IN$: C, 59.56; H, 5.50; N, 3.47. Found: C, 59.39; H, 5.45; N, 3.40. Its infrared absorption spectrum (taken in mineral oil) shows a band at $6.11\mu$, and its ultraviolet absorption spectrum (taken in methanol) shows $\lambda_{max.}$ at 206–208 m$\mu$ ($\epsilon$=21,130) and an inflection at about 220 m$\mu$ ($\epsilon$=17,290).

Example 26

A solution of 2,4-dimethyl-3-methylene-1,2,3,4-tetrahydro-1,4-ethano-isoquinolin in diethyl ether (prepared as shown below) is treated with a slight excess of an about 20 percent solution of hydrogen iodide in aqueous ethanol. The resulting precipitate is washed with diethyl ether to yield 1.0 g. of the 2,3,4-trimethyl-1,4-dihydro-1,4-ethano-isoquinolinium iodide, which melts at 213–215° (with decomposition) after recrystallizations from a mixture of acetone and diethyl ether and then from a mixture of ethanol and diethyl ether.

The starting material used in the above procedure is prepared as follows: A solution of 4-methyl-1,2,3,4-tetrahydro-1,4-ethano-isoquinolin-3-one in 120 ml. of toluene is treated with 0.5 g. of a 56 percent suspension of sodium amide in mineral oil and 20 ml. of methyl iodide. The reaction mixture is refluxed for six hours while stirring, then allowed to stand overnight and diluted with water and diethyl ether. The organic solution is washed with water, dried over magnesium sulfate and evaporated. The resulting crystalline 2,4-dimethyl-1,2,3,4-tetrahydro-1,4-ethano-isoquinolin-3-one of the formula

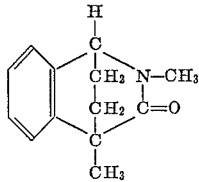

melts at 113–114° after recrystallization from diethyl ether. It analyzes as follows: Calcd. for $C_{13}H_{15}NO$: C, 77.58; H, 7.51; N, 6.96. Found: C, 77.80; H, 7.58; N, 6.90. Its infrared absorption spectrum (taken in mineral oil) shows a peak at $6.03\mu$ and a shoulder at $5.92$–$5.95\mu$, and the ultraviolet absorption spectrum (taken in methanol) shows $\lambda_{max.}$ 225 m$\mu$ ($\epsilon$=240), 262 m$\mu$ ($\epsilon$=320) and 270 m$\mu$ ($\epsilon$=280).

A solution of 0.8 g. of 2,4-dimethyl-1,2,3,4-tetrahydro-1,4-ethano-isoquinolin-3-one in 50 ml. of benzene is treated with 15 ml. of a 1.92 molar solution of methyl lithium in diethyl ether; after warming to about 45° for a few minutes, the reaction mixture is allowed to stand overnight and then poured onto ice and diluted with diethyl ether. The organic phase is washed several times with water and then extracted with a total of 80 ml. of a 1:1 mixture of concentrated hydrochloric acid and water. The acidic solution is chilled and made basic with cold concentrated aqueous sodium hydroxide. The oily 2,4-dimethyl-3-methylene-1,2,3,4 - tetrahydro-1,4-ethano-isoquinoline of the formula

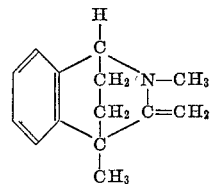

is extracted with a total of about 250 ml. of diethyl ether; the organic solution is washed with water, dried over potassium carbonate and used without further purification.

Example 27

A solution of 2-benzyl-3-methylene-1,2,3,4-tetrahydro-1,4-ethano-isoquinoline in diethyl ether (as prepared according to the procedure described below), when treated with a slight excess of hydrogen iodide in the form of a 5 percent ethanol solution yields an oily precipitate. The latter is washed by decantation with diethyl ether and crystallizes to yield 1.1 g. of the 2-benzyl-3-methyl-1,4-dihydro-1,4-ethano-isoquinolinium iodide of the formula

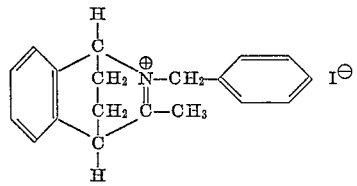

which melts at 169–170° after recrystallization from acetone. It analyzes as follows: Calcd. for $C_{19}H_{20}IN$: C, 58.62; H, 5.18; N, 3.60. Found: C, 57.72; H, 5.30; N, 4.04. Its infrared absorption spectrum (taken in mineral oil) shows a peak at $6.08\mu$, and its ultraviolet absorption spectrum (taken in ethanol) shows shoulders at 205 m$\mu$, 220 m$\mu$ and 254 m$\mu$.

The starting material used in the above procedure is prepared as follows: A mixture of 5.2 g. of 1,2,3,4-tetrahydro-1,4-ethano-isoquinolin-3-one, 7.1 ml. of benzyl bromide, 2.6 g. of a 56 percent suspension of sodium hydride in mineral oil, and 400 ml. of benzene is allowed to stand overnight while cooling and then treated with water. The organic layer is diluted with diethyl ether, washed with water, dried over magnesium sulfate and evaporated. The residue crystallizes from diethyl ether to yield 5.0 g. of 2-benzyl-1,2,3,4-tetrahydro-1,4-ethano-isoquinolin-3-one of the formula

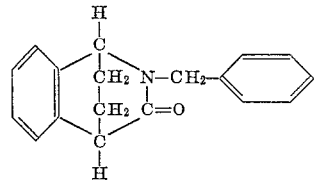

which melts at 85.5–87° after recrystallization from diethyl ether and analyzes as follows: Calcd. for $C_{18}H_{17}NO$: C, 82.10; H, 6.51; N, 5.32. Found: C, 82.27; H, 6.73; N, 5.34; and the infrared absorption spectrum (taken in mineral oil) shows a peak at $6.02\mu$.

A solution of 2.5 g. of 2-benzyl-1,2,3,4-tetrahydro-1,4-ethano-isoquinolin-3-one in 100 ml. of benzene is treated with 10 ml. of a 1.92 molar solution of methyl lithium in diethyl ether and refluxed for ten minutes. After standing at room temperature overnight, the reaction mixture is poured over ice and water; the organic material is extracted with diethyl ether and the organic solution is washed with several portions of water and extracted with several portions of a total of about 75 ml. of a 1:1-mixture of concentrated hydrochloric acid and water. The chilled acidic solution is made basic with cold concentrated aqueous sodium hydroxide, and the resulting 2-benzyl-3-methylene-1,2,3,4-tetrahydro - 1,4 - ethano - isoquinoline of the formula

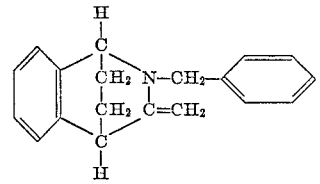

is extracted with diethyl ether; the organic solution is washed with water, dried over potassium carbonate, evaporated to a volume of about 100 ml. and used in the next step.

Example 28

The diethyl ether solution of 4-ethyl-2-methyl-3-methylene-1,2,3,4-tetrahydro - 1,4 - ethano - isoquinoline (prepared according to the procedure described below) is treated dropwise with a small excess of a solution of hydrogen iodide in aqueous ethanol. The oily precipitate crystallizes upon washing and trituration with diethyl ether to yield 2.9 g. of 4-ethyl-2,3-dimethyl-1,2,3,4-tetrahydro-1,4-ethano-isoquinolinium iodide of the formula

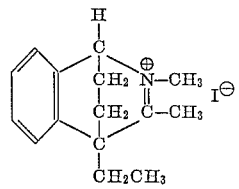

which is hydrated and melts at 92–96°. An anhydrous sample is obtained by recrystallization from a mixture of ethanol and diethyl ether, followed by drying at 70° under reduced pressure. It analyzes as follows: Calcd. for $C_{15}H_{20}IN$: C, 52.80; H, 5.91; N, 4.11. Found: C, 52.59; H, 6.22; N, 4.01; and the infrared absorption spectrum (taken in mineral oil) of the hydrated sample shows the strong —OH absorption and a peak at $6.06\mu$, whereas the ultraviolet absorption spectrum (taken in ethanol) shows a shoulder at 220 m$\mu$ ($\epsilon$=16,190).

The starting material used in the above procedure is prepared as follows: A mixture of 145.0 g. of 2-phenyl-butyronitrile and 125.0 g. of ethyl acrylate is treated dropwise with 5 ml. of a 40 percent solution of benzyl-trimethyl ammonium hydroxide in tertiary butanol. After the strongly exothermic reaction, subsides, an additional 5 ml. of the quaternary base is added, and the reaction mixture is heated in the water bath for three hours, cooled and taken up into chloroform. The organic solution is washed three times with water, dried over sodium sulfate and evaporated to yield the ethyl 4-cyano-4-phenyl-caproate, which is purified by distillation and collected at 115–117°/0.04 mm.

Upon hydrolysis of 122.5 g. of ethyl 4-cyano-4-phenyl-caproate with 275 ml. of a 2 N aqueous solution of sodium hydroxide, the 4-cyano-4-phenyl-caproic acid is obtained, which melts at 90–91° after recrystallization from aqueous ethanol.

A mixture of 21.7 g. of 4-cyano-4-phenyl-caproic acid and 70 ml. of concentrated sulfuric acid is heated for one hour on a boiling water bath with the exclusion of moisture. After cooling, the reaction mixture is poured over 150 g. of ice; the precipitate is triturated to yield 4-carbamyl-4-ethyl-1,2,3,4-tetrahydro - naphthalen-1-one, which melts at 149–150° after crystallization from ethyl acetate.

Upon refluxing 4-carbamyl-4-ethyl-1,2,3,4-tetrahydro-naphthalen-1-one with a mixture of acetic acid and hydrochloric acid, the 4-ethyl-1,2,3,4-tetrahydro-naphthalen-1-one 4-carboxylic acid is obtained which melts at 102–104°.

A solution of 50.0 g. of 4-ethyl-1,2,3,4-tetrahydronaphthalen-1-one 4-carboxylic acid in 1,500 ml. of ethanol, containing 150 ml. of concentrated sulfuric acid and 15 ml. of 30 percent fuming sulfuric acid, is refluxed for a total of 40 hours over a period of four days. The excess of ethanol is removed under reduced pressure, the residue is treated with cold water and the organic material is extracted with diethyl ether. The organic solution is washed with water and a dilute solution of sodium hydroxide in water, dried over magnesium sulfate, and evaporated to yield 56.3 g. of the oily ethyl 4-ethyl-1,2,3,4-tetrahydro-naphthalen-1-one 4-carboxylate, which is used without further purification. The 2,4-dinitro-phenylhydrazone derivative melts at 181–182° after several recrystallizations from ethanol.

A solution of 51.0 g. of the crude ethyl 4-ethyl-1,2,3,4-tetrahydro-naphthalen-1-one 4-carboxylate in about 400 ml. of ethanol is treated with a solution of 150.0 g. of hydroxylamine hydrochloride in about 100 ml. of water (neutralized with aqueous sodium hydroxide), and refluxed for 45 minutes. The reaction mixture is cooled and diluted with water, the oily material is extracted with diethyl ether, and the organic solution is washed with water, dried over magnesium sulfate and evaporated to yield 51.5 g. of the non-crystalline ethyl 4-ethyl-1-hydroxyimino-1,2,3,4-tetrahydro-naphthalene 4-carboxylate, which is used without further purification.

A solution of 51.5 g. of the crude ethyl 4-ethyl-1-hydroxyimino-1,2,3,4-tetrahydro-naphthalene 4-carboxylate in 500 ml. of ethanol containing about 20 g. of Raney nickel is treated at room temperature with hydrogen at an initial pressure of 3½ atmospheres. After 3½ hours, the reaction is interrupted, the catalyst is filtered off, and the filtrate is evaporated to yield the mixture of the cis- and the trans-ethyl 1-amino-4-ethyl-1,2,3,4-tetrahydro-naphthalene 4-carboxylate. The latter is heated on the steam bath for seven days; the crystalline material is harvested every day by trituration with diethyl ether to yield a total of 14.1 g. of the desired 4-ethyl-1,2,3,4-tetrahydro-1,4-methano-isoquinolin-3-one, which melts at 164–165° after recrystallization from a mixture of ethyl acetate and diethyl ether. It analyzes as follows: Calcd. for $C_{13}H_{15}NO$: C, 77.58; H, 7.51; N, 6.96. Found: C, 77.58; H, 7.61; N, 7.16; and its infrared absorption spectrum (taken in mineral oil) shows the —NH— band and a peak at 6.0–6.02$\mu$.

A solution of 5.0 g. of 4-ethyl-1,2,3,4-tetrahydro-1,4-methano-isoquinolin-3-one in 250 ml. of toluene is treated with 4.5 g. of a 56 percent mineral oil dispersion of sodium hydride and after 15 minutes with 20 ml. of methyl iodide. After refluxing for 5 hours while stirring and being allowed to stand overnight, the reaction mixture is treated with an additional 10 ml. of methyl iodide and is refluxed for three hours. The cooled suspension is treated with water and diluted with diethyl ether; the organic layer is separated, washed with water, dried over magnesium sulfate and evaporated. The resulting crystalline 4-ethyl-2 - methyl - 1,2,3,4 - tetrahydro - 1,4 - ethano - isoquinolin-3-one of the formula

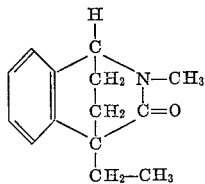

is triturated with diethyl ether (yield: 4.0 g.) and recrystallized from diethyl ether, M.P. 82–83°. It analyzes as follows: Calcd. for $C_{14}H_{17}NO$: C, 78.10; H, 7.96; N, 6.51. Found: C, 78.28; H, 8.01; N, 6.63; and its infrared absorpton spectrum (taken in mineral oil) shows a peak at 6.06$\mu$.

A solution of 2.8 g. of 4-ethyl-2-methyl-1,2,3,4-tetrahydro-1,4-ethano-isoquinolin-3-one in 150 ml. of benzene is treated with 50 ml. of a 1.92 molar solution of methyl lithium in diethyl ether and warmed to 45° for a few minutes. The reaction mixture is allowed to stand overnight, and then poured onto a mixture of ice and water and diluted with diethyl ether; after shaking, the organic layer is separated, washed with water and extracted with a total of about 200 ml. of a cold 1:1-mixture of concentrated hydrochloric acid and water. While cooling with ice, the acidic solution is carefully treated with a cold concentrated sodium hydroxide solution, and the oily 4-ethyl-2 - methyl - 3 - methylene - 1,2,3,4 - tetrahydro - 1,4-ethano-isoquinoline of the formula.

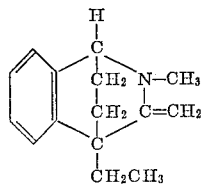

is extracted with about 200 ml. of diethyl ether. The organic solution is washed with water, dried over potassium carbonate, evaporated to a volume of 60 ml. and used in the next step without further purification.

Example 29

A mixture of 1.0 g. of 2,3-dimethyl-4-phenyl-1,2,3,4-thetetrahydro-1,4-ethano-isoquinoline (prepared according to the procedure described in my copending application Ser. No. 388,722, filed Aug. 10, 1964, which in turn is a continuation-in-part application of my application Ser. No. 314,494, filed Oct. 7, 1963, both being entitled, "Bridged Compounds"), and 20.0 g. of mercuric acetate in 100 ml. of glacial acetic acid is refluxed for three hours and then left on the steam bath for 2½ days. The acetic acid is evaporated under reduced pressure, and the cooled residue is treated with water and made basic with an aqueous sodium hydroxide solution. The resulting precipitate is washed with water and diethyl ether and digested with about 400 ml. of 7% hydrochloric acid by allowing to stand the suspension overnight at room temperature and heating it on the steam bath for two hours. The resulting solution is cooled, filtered and treated with small portions of sodium sulfide to completely precipitate the inorganic sulfide, which is then removed by filtration. The acidic filtrate is made basic with an excess of an aqueous sodium hydroxide solution, and the basic material is extracted with diethyl ether. The organic solution is washed with water, dried over potassium carbonate and evaporated to a volume of about 5–10 ml. to yield about 0.1 g. of the impure crystalline 2-methyl-3-methylene-4-phenyl-1,2,3,4-tetrahydro-1,4-ethano - isoquinoline, which melts at about 130–140°, and is dissolved in diethyl ether.

The above diethyl ether solution is treated with a slight excess of ethanolic hydrogen chloride; the resulting precipitate is washed with diethyl ether, re-precipitated with diethyl ether from a solution in a minimum amount of ethanol. The resulting 2,3-dimethyl-4-phenyl-1,4-dihydro-1,4-ethano-isoquinolinium chloride is recrystallized from a mixture of methanol and diethyl ether, M.P. 239–240° (with decomposition), and is identical with the compounds obtained according to the procedure described in Examples 2 and 3.

Example 30

A solution of 4-benzyl-2-methyl-3-methylene-1,2,3,4-tetrahydro-1,4-ethano-isoquinoline in diethyl ether (prepared according to the procedure described below) is treated with a slight excess of a 10 percent aqueous ethanolic solution of hydrogen iodide. The oily precipitate crystallizes upon trituration with a small amount of a mixture of ethanol and diethyl ether to yield 1.2 g. of 4-benzyl-2,3-dimethyl-1,4-dihydro-1,4-ethano - isoquinolinium iodide of the formula

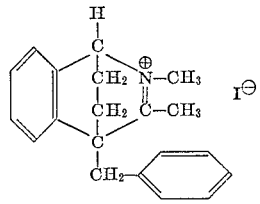

which melts at 239–249° (with decomposition), and analyzes as follows: Calcd. for $C_{20}H_{22}IN$: C, 59.56; H, 5.50; N, 3.47. Found: C, 59.68; H, 5.85; N, 3.58. Its infrared absorption spectrum (taken in mineral oil) shows a sharp peak at 6.09$\mu$.

The starting material used in the above procedure is prepared as follows: A solution of 80.0 g. of $\alpha$-carboxy-o-toluic acid in about 1,700 ml. of methanol is saturated with dry hydrogen chloride and refluxed for three hours. The major portion of the solvent is evaporated under reduced pressure, and the residue is poured over a mixture of ice and water. The oily material is extracted with diethyl ether, the ether solution is washed with water, a dilute aqueous solution of sodium hydroxide, and again with water, dried over magnesium sulfate and evaporated to yield 80 g. of the crude methyl α-carbomethoxy-o-toluate, which is used without further purification.

To a solution of 10.4 g. of sodium in 700 ml. of methanol is added 80 g. of the methyl α-carbomethoxy-o-toluate and 41.5 g. of benzaldehyde. The resulting brown solution is refluxed for thirty minutes, cooled and treated with about 1,500 ml. of water; the alkaline solution is acidified with hydrochloric acid, and the oily precipitate, which crystallizes on scratching, is washed with water, dried, triturated and recrystallized from diethyl ether. A total of 84 g. of α-benzylidene-α-carbomethoxy-o-toluic acid is obtained, which melts at 152–154° after recrystallization from ethyl acetate. It analyzes as follows: Calcd. for $C_{17}H_{14}O_4$: C, 72.33; H, 5.00. Found: C, 72.07; H, 4.97. Its infrared absorption spectrum (taken in mineral oil) shows peaks at 5.95μ (conjugated carboxyl) and at 5.87μ (conjugated carbomethoxy), whereas the ultraviolet absorption spectrum (taken in ethanol) shows $\lambda_{max.}$ at 276–280 mμ ($\epsilon=19,760$).

A mixture of 79 g. of α-benzylidene-α-carbomethoxy-o-toluic acid in 600 ml. of ethyl acetate containing about 6 g. of a 10 percent palladium-on-charcoal catalyst is treated with hydrogen at an initial pressure of about 3½ atmospheres. The reaction is interrupted after thirty minutes, the catalyst is filtered off, and the filtrate is evaporated to yield 80.0 g. of the crystalline α-benzyl-α-carbomethoxy-o-toluic acid, which melts at 106–108° after recrystallization from cyclohexane. It analyzes as follows: Calcd. for $C_{17}H_{16}O_4$: C, 71.82; H, 5.67. Found: C, 72.07; H, 5.80. Its infrared absorption spectrum (taken in mineral oil) shows peaks at 5.93μ (conjugated carboxyl) and 5.75μ (unconjugated carbomethoxy), and its ultraviolet absorption spectrum (taken in ethanol) shows $\lambda_{max.}$ only end absorption and 277 mμ ($\epsilon=1,090$).

A mixture of 69.0 g. of α-benzyl-α-carbomethoxy-o-toluic acid in 500 ml. of a 10 percent aqueous solution of sodium hydroxide is refluxed for forty minutes, cooled and acidified with hydrochloric acid. The resulting α-benzyl-α-carboxy-o-toluic acid is filtered off, washed with water and air-dried; M.P. 166–168° (with decomposition).

A suspension of the above α-benzyl-α-carboxy-o-toluic acid in about 200 ml. of acetic acid anhydride is heated until a complete solution is obtained, then refluxed for eight minutes and evaporated. The residue is dissolved in diethyl ether, the solution is filtered and allowed to stand; a total of 43 g. of the α-benzyl-α-carboxy-o-toluic acid anhydride precipitates, which is air-dried and recrystallized fro mdiethyl ether, M.P. 116–118°. It analyzes as follows: Calcd. for $C_{16}H_{12}O_3$: C, 76.18; H, 4.80. Found: C, 76.34; H, 4.82. Its infrared absorption spectrum (taken in mineral oil) shows peaks at 5.61μ and 5.74μ.

To a solution of 35.0 g. of α-benzyl-α-carboxy-o-toluic acid anhydride in 300 ml. of tetrahydrofuran is added 17.0 g. of potassium tertiary butoxide while stirring and cooling occasionally to prevent the temperature from rising above 25°. The orange solution is then treated with 10 ml. of acrylonitrile; the temperature of the reaction mixture rises slowly to slightly above 30° within about 5 minutes, and the intense coloring fades. An additional 12 ml. of acrylonitrile is added, and after being allowed to stand, the reaction mixture is refluxed gently for 1¼ hours. After standing overnight at room temperature, it is chilled, acidified with a 1:1-mixture of concentrated hydrochloric acid and water and diluted with water. The oily material is extracted with diethyl ether; the organic solution is washed with water, dried over magnesium sulfate and evaporated. The oily residue partially crystallizes; the oily portion is removed after two days by trituration and careful washing with diethyl ether to yield 9.1 g. of 4-benzyl-2-cyano-1,2,3,4-tetrahydro-naphthalen-1-one 4-carboxylic acid which melts at 191–193° (with decomposition) after recrystallization from diethyl ether. It analyzes as follows: Calcd. for $C_{19}H_{15}NO_3$: C, 74.74; H, 4.95; N, 4.59. Found: C, 74.68; H, 5.02; N, 4.50. Its infrared absorption spectrum (taken in mineral oil) shows a weak peak at 4.43–4.44μ, and peaks at 5.85μ and 5.92μ, whereas its ultraviolet absorption spectrum (taken in methanol) shows $\lambda_{max.}$ at 204 mμ ($\epsilon=26,380$), 230 mμ ($\epsilon=13,150$) and 295 mμ ($\epsilon=7,300$) with a shoulder at 232 mμ ($\epsilon=13,100$).

A mixture of 9.9 g. of 4-benzyl-2-cyano-1,2,3,4-tetrahydro-naphthalen-1-one 4-carboxylic acid in 50 ml. of glacial acetic acid and 250 ml. of concentrated hydrochloric acid is slowly heated to reflux over a period of 1¼ hours. An additional 20 ml. of acetic acid and concentrated hydrochloric acid is added and refluxing is continued for 2¾ hours. The cooled reaction mixture is diluted with about three volumes of water, and the organic material is extracted with diethyl ether. The organic solution is washed with water, dried over magnesium sulfate and evaporated to yield 9 g. of the oily 4-benzyl-1,2,3,4-tetrahydro-naphthalen - 1 - one 4-carboxylic acid. Its 2,4-dinitro-phenylhydrozone melts at 273–275° (with decomposition) after trituration with hot ethanol and recrystallization from ethyl acetate; it analyzes as follows: Calcd. for $C_{24}H_{20}N_4O_6$: C, 62.60; H, 4.38; N, 12.17. Found: C, 62.57; H, 4.60; N, 12.32.

A mixture of about 9 g. of 4-benzyl-1,2,3,4-tetrahydro-naphthalen-1-one 4-carboxylic acid and a solution of 37 ml. of concentrated and 5.5 ml. of 30 percent fuming sulfuric acid in 1,000 ml. of ethanol is refluxed for 21 hours. The major portion of the alcohol is then evaporated under reduced pressure; the residue is cooled, treated with ice and water, and extracted with diethyl ether. The organic solution is washed with water and a dilute aqueous solution of sodium hydroxide, dried over magnesium sulfate and evaporated to yield 9.2 g. of the non-crystalline ethyl 4-benzyl-1,2,3,4-tetrahydro-naphthalen-1-one 4-carboxylate. Its 2,4-dinitro-phenyl-hydrozone melts at 164.5–167.5° after recrystallization from a mixture of ethanol and ethyl acetate and analyzes as follows: Calcd. for $C_{26}H_{24}O_4N_6$: C, 63.92; H, 4.95; N, 11.47. Found: C, 63.93; H, 5.18; N, 11.76.

To 8.5 g. of ethyl 4-benzyl-1,2,3,4-tetrahydro-naphthalen-1-one 4-carboxylate is added a solution of 25.0 g. of hydroxylamine hydrochloride and 10.0 g. of potassium hydroxide in 200 ml. of water and 200 ml. of ethanol, and the reaction mixture is refluxed for three hours. The cold solution is diluted with water, and the oily material is extracted with diethyl ether; the organic solution is washed with several portions of water, dried over magnesium sulfate and evaporated to yield the crude ethyl 4-benzyl - 1-hydroxyimino - 1,2,3,4 - tetrahydro-naphthalene 4-carboxylate. A sample of the residue is dissolved in ethanol, the solution is clarified with a charcoal preparation and is allowed to evaporate in the presence of petroleum ether over a period of several days. The resulting crystalline material is triturated with diethyl ether and petroleum ether and is used to seed the crude product. A total of 4.3 g. of the crystalline ethyl 4-benzyl-1-hydroxyimino - 1,2,3,4-tetrahydro-naphthalene 4-carboxylate is obtained, which melts at 85–87° after recrystallization from diethyl ether and petroleum ether. It analyzes as follows: Calcd. for $C_{20}H_{21}N_2O_3$: C, 74.28; H, 6.55; N, 4.33. Found: C, 74.01; H, 6.61; N, 4.53. Its infrared absorption spectrum (taken in mineral oil) shows the broad =N—OH band, a peak at 5.81μ and a C=N-shoulder, whereas its ultraviolet absorption spectrum (taken in ethanol) shows $\lambda_{max.}$ at 208 mμ ($\epsilon=25,620$) and 255 mμ ($\epsilon=11,740$), and a shoulder at 298 mu ($\epsilon=510$).

A solution of 8.0 g. of ethyl 4-benzyl-1-hydroximino-1,2,3,4-tetrahydro-naphthalene 4-carboxylate in 300 ml. of ethanol containing 7.0 g. of Raney nickel is treated at room temperature with hydrogen under an initial pressure of about 3½ atmospheres. After 45 minutes, the reaction is interrupted, the catalyst is filtered off, and the filtrate is evaporated to yield the mixture of the cis- and the trans-ethyl 1-amino-4-benzyl-1,2,3,4-tetrahydronaphthalene 4-carboxylate, which is heated on the steam bath for four days. The resulting product is triturated with diethyl ether to yield 1.7 g. of the 4-benzyl-1,2,3,4-tetrahydro-1,4-ethano-isoquinolin-3-one. It melts at 188–190° after recrystallization from ethanol and drying under reduced pressure; it analyzes as follows: Calcd. for $C_{18}H_{17}NO$: C, 82.10; H, 6.51; N, 5.32. Found: C, 81.67; H, 6.70; N, 5.15; and its infrared absorption spectrum (taken in mineral oil) shows a broad peak at 3.12μ, and a peak at 5.96μ.

A suspension of 1.5 g. of 4-benzyl-1,2,3,4-tetrahydro-1,4-ethano-isoquinolin-3-one and 0.6 g. of a 56 percent mineral oil suspension of sodium hydride in 100 ml. of toluene is treated with 20 ml. of methyl iodide and is refluxed and stirred for 6½ hours. After standing overnight while cooling, the reaction mixture is diluted with water and then with diethyl ether; the organic layer is separated, washed with water, dried over magnesium sulfate and evaporated to yield 1.5 g. of the oily 4-benzyl-2-methyl-1,2,3,4-tetrahydro-1,4-ethano-isoquinolin-3-one of the formula

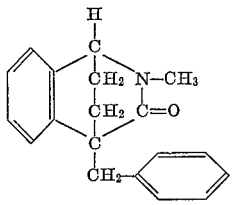

which crystallizes in the presence of petroleum ether and melts at 126–128° after recrystallizations from a mixture of methanol and diethyl ether, and from diethyl ether. It analyzes as follows: Calcd. for $C_{19}H_{19}NO$: C, 82.28; H, 6.91; N, 5.05. Found: C, 82.49; H, 7.07; N, 5.31; and its infrared absorption spectrum (taken in mineral oil) shows an intense peak at 6.01μ and no —NH— band.

A solution of 1.0 g. of 4-benzyl-2-methyl-1,2,3,4-tetrahydro-1,4-ethano-isoquinolin-3-one in 60 ml. of benzene is treated with 15 ml. of a 1.92 molar solution of methyl lithium in diethyl ether and is refluxed for 13 minutes. The reaction mixture is cooled, poured over ice and extracted with diethyl ether. The organic solution is washed with water and extracted with several portions of a total of 60 ml. of a 1:1-mixture of concentrated hydrochloric acid and water. The ice-chilled acidic extract is made basic by gradually adding a cold, concentrated solution of sodium hydroxide in water, and the resulting 4-benzyl-2-methyl-3-methylene-1,2,3,4-tetrahydro-1,4-ethano-isoquinoline of the formula

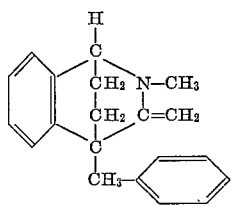

is extracted with diethyl ether. The organic solution is washed with water, dried over potassium carbonate and carefully evaporated to a volume of about 250 ml.

Example 31

A solution of 0.9 g. of 4-cyclopentyl-2-methyl-1,2,3,4-tetrahydro-1,4-ethano-isoquinolin-3-one in 60 ml. of benzene is treated with 15 ml. of a 1.92 molar solution of methyl lithium in diethyl ether. The reaction mixture is refluxed for one hour, cooled and diluted with water and diethyl ether. The organic layer, containing the 4-cyclopentyl-2-methyl-3-methylene-1,2,3,4-tetrahydro-1,4-ethano-isoquinoline of the formula

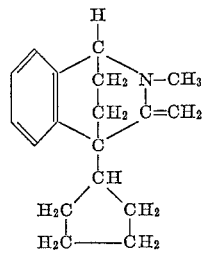

is washed with water and extracted with 50 ml. of a cold 1:1-mixture of concentrated hydrochloric acid and water. From the aqueous acidic phase, 0.2 g. of the desired 4-cyclopentyl - 2,3 - dimethyl-1,4-dihydro-1,4-ethano-isoquinolinium chloride of the formula

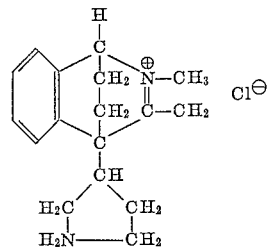

precipitates and is filtered off; the filtrate is worked up as shown in Example 32. The above crystalline material is triturated and recrystallized from ethanol, which melts as the monohydrate at 243–244° (with decomposition) after drying under reduced pressure, and analyzes as follows: Calcd. for $C_{18}H_{24}ClN \cdot H_2O$: C, 70.22; H, 8.51; N, 4.55. Found: C, 70.59; H, 8.81; N, 4.69. Its infrared absorption spectrum (taken in mineral oil) shows a peak at 6.08μ.

The starting material used in the above procedure is prepared as follows: To a cold suspension of 5.0 g. of sodium amide in 1,500 ml. of toluene are added while stirring 136 ml. of phenylaceto/nitrile and then 142 ml. of cyclophentyl bromide over a period of thirty minutes while keeping the temperature at 35°. The reaction mixture is then gently heated to reflux over a period of 1¼ hours and refluxed for five hours while stirring. After standing and cooling overnight and diluting it with water, the reaction mixture is extracted with diethyl ether; the organic phase is washed neutral with water, dried over magnesium sulfate and evaporated. The resulting α-cyclopentyl-phenylaceto/nitrile is purified by distillation and collected at 138–148°/0.8 mm.; yield 171.5 g.

A solution of 71.5 g. of α-cyclopentyl-phenylaceto/nitrile in 2000 ml. of tertiary butanol is treated with dry sodium methoxide (prepared from 5.3 g. of sodium) and then with 67 ml. of acrylonitrile. The temperature rises to about 43°, and after standing for 1½ hours, the reaction mixture is heated to 70° for 1¾ hours. The cooled solution is acidified with hydrochloric acid, treated with ice and water and extracted with diethyl ether. The organic solution is washed with several portions of water, dried over magnesium sulfate and evaporated to yield 208 g. of the non-crystalline α-cyclopentyl-α-phenyl-glutaronitrile, which is used without further purification.

A solution of 208 g. of the crude α-cyclopentyl-α-phenyl-glutaronitrile in 500 ml. of glacial acetic acid and 500 ml. of concentrated hydrochloric acid is refluxed for two hours, diluted with an additional 200 ml. of glacial acetic acid and again refluxed for 4½ hours. The excess of reagents is evaporated under reduced pressure, and the residue is treated with ice-water to yield an oily product, which is extracted with diethyl ether. The organic solution is washed with water, a 5 percent aqueous solution of sodium hydroxide, and with water, dried over magnesium sulfate and evaporated to a smaller volume whereupon the solid α-cyclopentyl-α-phenyl-glutaric acid imide crystallizes, yield: 175.3 g. It melts at 108.5–110° after recrystallization from diethyl ether and analyzes as follows: Calcd. for $C_{16}H_{19}NO_2$: C, 74.68; H, 7.44; N, 5.44. Found: C, 75.06; H, 7.50; N, 5.24. Its infrared absorption spectrum (taken in mineral oil) shows peaks at about $3.14\mu$, $5.83\mu$, and $5.92\mu$.

A mixture of 175.0 g. of α-cyclopentyl-α-phenyl-glutaric acid imide and a solution of 700.0 g. of potassium hydroxide in 1,300 ml. of water is refluxed for a total of 33 hours over a period of seven days while stirring, and being left on the steam bath during the night periods. The reaction mixture is chilled, diluted with water and acidified with hydrochloric acid. The resulting semi-solid material is extracted with diethyl ether, the organic solution is washed with water, dried over magnesium sulfate and evaporated to yield 189 g. of a mixture of γ-carbamyl-γ-cyclopentyl-γ-phenyl-butyric acid and α-cyclopentyl-α-phenylglutaric acid. A total of 140 g. of the mixture is allowed to stand under diethyl ether containing a small amount of ethyl acetate, whereupon partial crystallization set in. The resulting product is triturated with a mixture of diethyl ether and petroleum ether to yield in two crops a total of 39.5 g. of the γ-carbamyl-γ-cyclopentyl-γ-phenyl-butyric acid, which melts at 161–162° after recrystallization from a mixture of ethanol and diethyl ether and analyzes as follows: Calcd. for $C_{16}H_{21}NO_3$: C, 69.79; H, 7.69; N, 5.09. Found: C, 69.83; H, 7.85; N, 5.05. Its infrared absorption spectrum (taken in mineral oil) shows —OH and —NH— bands and peaks at $5.85\mu$ and $6.09\mu$.

The above mother liquors are evaporated, and 96.0 g. of the residue is refluxed for a total of 71 hours (extending over three weeks) with 1,000 ml. of a 30 percent aqueous potassium hydroxide solution. The oily α-cyclopropyl-α-phenyl-glutaric acid is obtained according to the procedure described above and used without further purification.

A solution of the above crude α-cyclopentyl-α-phenyl-glutaric acid in 2,000 ml. of concentrated sulfuric acid, prepared at room temperature, is allowed to stand at 3½ hours, then poured over ice. The oily material is extracted with diethyl ether; the organic solution is washed with water and then extracted with a dilute aqueous solution of sodium hydroxide. The aqueous extract is acidified with hydrochloric acid and the organic material is extracted with diethyl ether; the organic solution is washed with water, dried over magnesium sulfate and evaporated. The residue is seeded with a sample obtained according to the process described below to yield 25 g. of the 4-cyclopentyl-1,2,3,4-tetrahydro-naphthalen-1-one 4-carboxylic acid which melts at 111–114°.

The 4-cyclopentyl-1,2,3,4-tetrahydro-naphthalen-1-one 4-carboxylic acid is also obtained as follows: A total of 4.0 g. of γ-carbamyl-γ-cyclopentyl-γ-phenyl-butyric acid is dissolved slowly in 800 ml. of concentrated sulfuric acid; the solution is allowed to stand for 2¾ hours at room temperature and is then poured onto ice. The organic material is extracted with diethyl ether; the organic solution is washed with water, a dilute aqueous solution of potassium hydroxide and with water, dried over magnesium sulfate and evaporated. The oily residue crystallizes partly under diethyl ether and is triturated with the same solvent to yield 8.2 g. of the 4-carbamyl-4-cyclopentyl-1,2,3,4-tetrahydro-naphthalen-1-one, which melts at 110–112° after recrystallization from diethyl ether and petroleum ether; it analyzes as follows: Calcd. for $C_{16}H_{19}NO_2$: C, 74.86; H, 7.44; N, 5.44. Found. C, 74.93; H, 7.69; N, 5.60; and its infrared absorption spectrum (taken in mineral oil) shows bands at $2.91\mu$, $5.80\mu$, $5.59\mu$ and $6.03\mu$, whereas its ultraviolet absorption spectrum (taken in ethanol) shows $\lambda_{max}$ at 207 m$\mu$ ($\epsilon$=20,600), 251 m$\mu$ ($\epsilon$=5,150) and 292–296$\mu$ ($\epsilon$=830).

A mixture of 8.0 g. of 4-carbamyl-4-cyclopentyl-1,2,3,4-tetrahydro-naphthalen-1-one in 110 ml. of glacial acetic acid and 300 ml. of concentrated hydrochloric acid is refluxed for 4½ hours, then treated with an additional 100 ml. of concentrated hydrochloric acid and refluxed for 6½ hours. The reaction mixture is concentrated under reduced pressure to a small volume, cooled and poured over ice; the organic material is extracted with diethyl ether, and the organic solution is washed with water and extracted with a dilute aqueous solution of sodium hydroxide. The basic extract is acidified with hydrochloric acid, and the acidic solution is extracted with diethyl ether. After washing with water and drying over magnesium sulfate, the organic solution is evaporated to yield 3.6 g. of the glassy 4-cyclopentyl-1,2,3,4-tetrahydro-naphthalen-1-one 4-carboxylic acid, which crystallizes slowly, and is triturated and recrystallized with a mixture of diethyl ether and petroleum ether, M.P. 113–115°. It analyzes as follows: Calcd. for $C_{16}H_{18}O_3$: C, 74.39; H, 7.02. Found: C, 74.06; H, 6.90; and its infrared absorption spectrum (taken in mineral oil) shows an —OH band and bands at $5.85\mu$ and at $6.08\mu$, and the ultraviolet absorption spectrum (taken in ethanol) shows $\lambda_{max}$ at 207m$\mu$ ($\epsilon$=21,730), 250 m$\mu$ ($\epsilon$=10,900) and 294 m$\mu$ ($\epsilon$=1,730).

A mixture of 28.0 g. of 4-cyclopentyl-1,2,3,4-tetrahydro-naphthalen-1-one 4-carboxylic acid in a solution of 74 ml. of concentrated sulfuric acid and 11 ml. of 30 percent oleum in 2,100 ml. of absolute ethanol is refluxed for four days. The excess of ethanol is distilled off under reduced pressure, and the residual material is poured over ice. The organic material is extracted with diethyl ether; the organic solution is washed with water, a dilute aqueous solution of sodium hydroxide, and again with water, dried over magnesium sulfate and evaporated, to yield 27.0 g. of the non-crystalline ethyl 4-cyclopentyl-1,2,3,4-tetrahydro-naphthalen-1-one 4-carboxylate is obained, which is used in the next step without further purification.

A mixture of 25.0 g. of ethyl 4-cyclopentyl-1,3,3,4-tetrahydro-naphthalen-1-one 4-carboxylate, and a solution of 70.0 g. of hydroxylamine hydrochloride and 28.0 g. of sodium hydroxide in 700 ml. of a 1:1-mixture of ethanol and water is refluxed for 2½ hours. After cooling overnight, the crystalline ethyl 4-cyclopentyl-1-hydroxyimino-1,2,3,4-tetrahydronaphthalene 4-carboxylate precipitates and is recrystallized from diethyl ether, M.P. 134.5–135.5° It analyzes as follows: Calcd. for $C_{18}H_{23}NO_3$: C, 71.23; H, 7.69; N, 4.65. Found: C, 72.18; H, 8.27; N, 4.65; and its infrared absorption spectrum (taken in mineral oil) shows a broad =N—OH band and a peak at $5.80\mu$, whereas its ultraviolet absorption spectrum (taken in ethanol) shows $\lambda_{max}$ 253 m$\mu$.

A solution of 12.0 g. of ethyl 4-cyclopentyl-1-hydroxyimino-1,2,3,4-tetrahydro-naphthalene 4-carboxylate in 200 ml. of ethanol containing 12.0 g. of Raney-nickel is treated at room temperature with hydrogen at an initial pressure of about 3½ atmospheres. After completion of the hydrogenation, the catalyst is then filtered off, and the filtrate is evaporated to yield the crude mixture of the cis- and the trans-ethyl 1-amino-4-cyclo-pentyl-1,2,3,4-tetrahydro-naphthalene 4-carboxylate, which is heated on the steam bath for five days. The residue is dissolved in diethyl ether; the organic solution is washed with dilute hydrochloric acid and water, dried over magnesium sulfate and evaporated to yield about 2 g. of an oil which crystallizes on trituration with diethyl ether. The desired 4-cyclopentyl-1,2,3,4-tetrahydro-1,4-ethano-isoquinolin-3-one is recrystallized from diethyl ether, M.P. 157–158°, and analyzes as follows: Calcd. for $C_{16}H_{19}NO$: C, 79.63; H, 7.94; N, 5.80. Found: C, 79.57; H, 8.16; N, 6.00. Its infrared spectrum (taken in mineral oil) shows an —NH— band and a peak at $5.98\mu$. From the mother liquors, an additional amount of the desired 4-cyclopentyl-1,2,3,4-tetrahydro-1,4-ethano-isoquinolin-3-one is obtained by reheating the residue on the steam bath.

A mixture of 0.9 g. of 4-cyclopentyl-1,2,3,4-tetrahydro-1,4-ethano-isoquinolin-3-one, 0.5 g. of a 56 percent mineral oil suspension of sodium hydride and 20 ml. of methyl iodide in 70 ml. of toluene is refluxed for 7 hours. The suspension is cooled, treated with water and diluted with diethyl ether. The separated organic layer is washed repeatedly with water, dried over magnesium sulfate and evaporated to yield an oil, which crystallizes from petroleum ether to yield 0.9 g. of 4-cyclopentyl-2-methyl-1,2,3,4-tetrahydro-1,4-ethano-isoquinolin-3-one of the formula

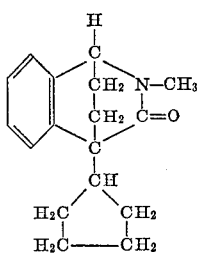

It melts at 94–95° after recrystallization from a mixture of diethyl ether and petroleum ether and analyzes as follows: Calcd. for $C_{17}H_{21}NO$: C, 79.96; H, 8.29; N, 5.49. Found: C, 80.05; H, 8.45; N, 5.55. Its infrared absorption spectrum (taken in mineral oil) shows an intense band at $6.03\mu$ and no —NH— band.

Example 32

The aqueous acidic filtrate obtained after the removal of the 4-cyclopentyl-2,3-dimethyl-1,4-dihydro-1,4-ethano-isoquinolinium chloride (see procedure described in Example 31) is cooled and made basic with a concentrated aqueous solution of sodium hydroxide; the organic material is extracted with diethyl ether, and the organic solution is washed with water, dried over potassium carbonate, filtered and reacted with a slight excess of a 10 percent aqueous ethanol solution of hydrogen iodide. The resulting 4-cyclopentyl-2,3-dimethyl-1,4-dihydro-1,4-ethano-isoquinolinium iodide melts at 213–216° (with decomposition) after recrystallization from a mixture of ethanol and diethyl ether. It analyzes as follows: Calcd. for $C_{18}H_{24}IN$: C, 56.70; H, 6.34; N, 3.67. Found: C, 56.44; H, 6.53; N, 3.69; and its infrared absorption spectrum (taken in mineral oil) shows a peak at $6.09\mu$.

Example 33

Other compounds of this invention prepared according to the previously-described and illustrated procedure by selecting the appropriate starting materials are, for example, 2-ethyl-3-methyl-4-phenyl-1,4-dihydro-1,4-ethano-isoquinolinium bromide, prepared by reacting 3-methyl-4-phenyl-1,4-dihydro-1,4-ethano-isoquinoline with ethyl bromide;

2-benzyl-3-methyl-4-phenyl-1,4-dihydro-1,4-ethano-isoquinolinium bromide, prepared by reacting 3-methyl-4-phenyl-1,4-dihydro-1,4-ethano-isoquinoline with benzyl bromide;

2,3-dimethyl-1,4-dihydro-1,4-ethano-isoquinolinium bromide, prepared by reacting 2-methyl-3-methylene-1,2,3,4-tetrahydro-1,4-ethano-isoquinoline with hydrogen bromide;

2,3-diethyl-4-phenyl-1,4-dihydro-1,4-ethano-isoquinolinium iodide, prepared by treating 1-hydroxyimino-4-phenyl-4-propionyl-1,2,3,4-tetrahydro-naphthalene with hydrogen in the presence of palladium on charcoal, and reacting the resulting 3-ethyl-4-phenyl-1,4-dihydro-1,4-ethano-isoquinoline with ethyl iodide;

2-(2-methoxyethyl)-3-methyl-4-phenyl-1,4-dihydro-1,4-ethano-isoquinolinium bromide, prepared by reacting 3-methyl-4-phenyl-1,4-dihydro-1,4-ethano-isoquinoline with 2-methoxyethyl bromide;

2-methyl-3-isopropyl-4-phenyl-1,4-dihydro-1,4-ethano-isoquinolinium iodide, prepared by treating 1-hydroxyimino-4-isobutyryl-4-phenyl-1,2,3,4-tetrahydro-naphthalene with hydrogen in the presence of palladium on charcoal, and reacting the resulting 3-isopropyl-4-phenyl-1,4-dihydro-1,4-ethano-isoquinoline with methyl iodide;

2-methyl-4-pheny-3-(2-phenylethyl)-1,4-dihydro-1,4-ethano-isoquinolinium iodide, prepared by reacting 1-hydroxyimino-4-phenyl-4-(β-phenylpropionyl)-1,2,3,4-tetrahydro-naphthalene with hydrogen in the presence of palladium on charcoal, and reacting the resulting 4-phenyl-3-(2-phenylethyl)-1,4-dihydro-1,4-ethano-isoquinoline with methyl iodide;

2,3-dimethyl-4-(4-methyl-phenyl)-1,4-dihydro-1,4-ethano-isoquinolinium p-toluene sulfonate, prepared by treating 4-acetyl-4-(4-methyl-phenyl)-1,2,3,4-tetrahydro-naphthalen-1-one dioxime with hydrogen in the presence of palladium on charcoal, and reacting the resulting 3-methyl-4-(4-methyl-phenyl)-1,4-dihydro-1,4-ethano-isoquinoline with methyl p-toluene sulfonate;

3,4-diethyl-2-methyl-1,4-dihydro-1,4-ethano-isoquinolinium iodide, prepared by treating 1-hydroxyimino-4-ethyl-4-propionyl-1,2,3,4-tetrahydro-naphthalene with hydrogen in the presence of palladium on charcoal, and reacting the resulting 3,4-diethyl-1,4-dihydro-1,4-ethano-isoquinoline with methyl iodide;

2-ethyl-4-(4-methoxy-phenyl)-3-phenyl-1,4-dihydro-1,4-ethano-isoquinolinium bromide, prepared by treating 4-benzoyl-1-hydroxyimino-4-(4-methoxy-phenyl)-1,2,3,4-tetrahydro-naphthalene with hydrogen in the presence of palladium on charcoal, and reacting the resulting 4-(4-methoxy-phenyl)-3-phenyl-1,4-dihydro-1,4-ethano-isoquinoline with ethyl bromide;

7-chloro-4-(4-chloro-phenyl)-2,3-dimethyl-1,4-dihydro-1,4-ethano-isoquinolinium iodide, prepared by treating 4-acetyl-7-chloro-4-(4-chloro-phenyl)-1,2,3,4-tetrahydro-naphthalen-1-one dioxime with hydrogen in the presence of palladium on charcoal, and reacting the resulting 7-chloro-4-(4-chloro-phenyl)-3-methyl-1,4-dihydro-1,4-ethano-isoquinoline with methyl iodide;

3-benzyl-2-methyl-7-methoxy-4-phenyl-1,4-dihydro-1,4-ethano-isoquinolinium methosulfate, prepared by treating 1-hydroxyimino-7-methoxy-4-phenyl-acetyl-4-phenyl-1,2,3,4-tetrahydro-naphthalene with hydrogen in the presence of palladium on charcoal, and reacting the resulting -benzyl-7-methoxy-4-phenyl-1,4-dihydro-1,4-ethano-isoquinoline with dimethyl sulfate;

4-phenyl-2,3,6,7-tetramethyl-1,4-dihydro-1,4-ethano-isoquinolinium iodide, prepared by treating 4-acetyl-4-phenyl-6,7-dimethyl-1,2,3,4-tetrahydro-naphthalen-1-one dioxime with hydrogen in the presence of palladium on charcoal, and reacting the resulting 4-phenyl-3,6,7-trimethyl-1,4-dihydro-1,4-ethano-isoquinoline with methyl iodide;

4-cyclohexyl-2,3-dimethyl-1,4-dihydro-1,4-ethano-isoquinolinium chloride, prepared by reacting 4-cyclohexyl-2-methyl-1,2,3,4-tetrahydro-1,4-ethano-isoquinolin-3-one with methyl lithium, and treating the resulting 4-cyclohexyl-2-methyl-3-methylene-1,2,3,4-tetrahydro-1,4-ethano-isoquinoline with hydrogen chloride;

4-cyclopentylmethyl-3-ethyl-2-methyl-1,4-dihydro-1,4-ethano-isoquinolinium chloride, prepared by reacting 4-cyclopentylmethyl-2-methyl-1,2,3,4-tetrahydro-1,4-ethano-isoquinolin-3-one with ethyl lithium, and treating the resulting 4-cyclopentylmethyl-3-ethylidene-2-methyl-1,2,3,4-tetrahydro-1,4-ethano-isoquinoline with hydrogen chloride;

2-cyclohexylmethyl-3-methyl-4-phenyl-1,4-dihydro-1,4-ethano-isoquinolinium bromide, prepared by reacting 3-methyl-4-phenyl-1,4-dihydro-1,4-ethano-isoquinoline with cyclohexylmethyl bromide, and the like.

Example 34

Pharmaceutical compositions comprise essentially a pharmacologically effective amount, preferably from about ten percent to about ninety percent, of a 2-$R_1$-3-$R_2$-4-$R_3$-1,4-dihydro-1,4-ethano-isoquinolinium salt of this invention, having the previous Formula I, particularly of a compound of the formula

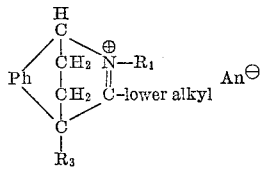

in which Ph, $R_1$, $R_3$ and $An^\ominus$ have the previously-given meaning, such as a 2,3-di-lower alkyl-4-phenyl-1,4-dihydro-1,4-ethano-isoquinolinium halide, as the pharmacologically effective ingredient, and a pharmaceutically acceptable carrier. These pharmaceutical compositions are prepared according to the known methods of manufacturing such preparations, using the standard carrier materials.

For example, capsules, each containing 0.1 g. of 2,3-dimethyl-4-phenyl-1,4-dihydro-1,4-ethano-isoquinolinium iodide as the pharmacologically active ingredient, are prepared as follows (for 10,000 capsules):

| Ingredients: | G. |
|---|---|
| 2,3 - dimethyl - 4 - phenyl-1,4-dihydro-1,4-ethano-isoquinolinium iodide | 1,000.0 |
| Lactose, U.S.P. | 2,500.0 |

The lactose is placed in a suitable mixer, the 2,3-dimethyl-4 - phenyl - 1,4-dihydro-1,4-ethano-isoquinolinium iodide is added, and the mixture is agitated until the powders are homogeneously distributed. Portions of 0.35 g. of the resulting mixture are then filled into No. 1 gelatine capsules.

Capsules each containing 0.05 g. of 2,3-dimethyl-4-phenyl-1,4-dihydro-1,4-ethano-isoquinolinium chloride as the pharmacologically active ingredient, are prepared as follows (for 50,000 capsules):

| Ingredients: | G. |
|---|---|
| 2,3 - dimethyl - 4 - phenyl-1,4-dihydro-1,4-ethano-isoquinolinium chloride | 2,500.0 |
| Lactose, U.S.P. | 15,000.0 |

No. 1 gelatine capsules are filled with 0.35 g. each of a mixture of the ingredients prepared as described above.

Capsules, each containing 0.1 g. of 2,3-dimethyl-4-phenyl-1,4-dihydro-1,4-ethano-isoquinolinium chloride as the pharmacologically active ingredient, are prepared as follows (for 100,000 capsules):

| Ingredients: | G. |
|---|---|
| 2,3 - dimethyl - 4-phenyl-1,4-dihydro-1,4-ethano-isoquinolinium chloride | 10,000.0 |
| Lactose, U.S.P. | 25,000.0 |

No. 1 gelatin capsules are filled with 0.35 g. each of a mixture of the ingredients prepared as described above.

Capsules each containing 0.5 g. of 2,3-dimethyl-4-phenyl-1,4-dihydro-1,4-ethano-isoquinolinium chloride as the pharmacologically active ingredient, are prepared as follows (for 1,000 capsules):

| Ingredients: | G. |
|---|---|
| 2,3 - dimethyl - 4-phenyl - 1,4-dihydro-1,4-ethano-isoquinolinium chloride | 500.0 |
| Corn starch | 45.0 |
| Magnesium stearate | 15.0 |

The corn starch and the magnesium stearate are mixed with 100 g. of the 2,3-dimethyl-4-phenyl-1,4-dihydro-1,4-ethano-isoquinolinium chloride and passed through a No. 40 mesh screen. After remixing, the remaining 2,3-dimethyl - 4 - phenyl-1,4-dihydro-1,4-ethano-isoquinolinium chloride is added, and mixing is continued. Portions of 0.56 g. of the resulting mixture are filled into No. 0 hard gelatin capsules.

Tablets, each containing 0.5 g. of 2,3-dimethyl-4-phenyl-1,4-dihydro-1,4-ethano-isoquinolinium chloride as the pharmacologically active ingredient, are prepared as follows (for 20,000 tablets):

| Ingredients: | G. |
|---|---|
| 2,3 - dimethyl - 4-phenyl-1,4-dihydro-1,4-ethano-isoquinolinium chloride | 10,000.0 |
| Gelatin | 150.0 |
| Corn starch (anhydrous) | 726.0 |
| Corn starch (anhydrous) | 308.0 |
| Talcum | 625.0 |
| Corn starch | 625.0 |
| Stearic acid | 66.0 |
| Purified water | q.s. |

The 2,3 - dimethyl-4-phenyl-1,4-dihydro-1,4-ethano-isoquinolinium chloride is passed through a No. 16 mesh screen; 825.0 g. of corn starch (equivalent of 726.0 g. of anhydrous material) is added and mixed.

The gelatin is dissolved in 2,000 ml. of water, and 350.0 g. of corn starch (equivalent of 308.0 g. of anhydrous material) is suspended in 400 ml. of cold water and combined with the gelatin solution. The resulting mixture is heated on a water bath until a paste is formed.

The mixture of the 2,3-dimethyl-4-phenyl-1,4-dihydro-1,4-ethano-isoquinolinium chloride and the corn starch is granulated with this paste, using additional water, if necessary. The wet mixture is passed through a No. 4A screen on a Fitzpatrick mill, dried at 49° and then broken on a No. 10 wire mesh screen on the Fitzpatrick mill, knives forward.

The granules are returned to the mixer, the talcum, stearic acid and 625.0 g. of corn starch are added, and after mixing, the granules are compressed into tablets, each weighing 0.625 g., using standard concave punches, scored and monogrammed.

I claim:

1. A 1,4 - dihydro - 1,4-ethano-isoquinolinium salt of the formula

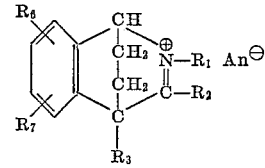

in which each of $R_1$ and $R_2$ stands for hydrogen, lower alkyl, $R_4$-phenyl-lower alkyl $R_3$ for hydrogen, lower alkyl, $R_5$-phenyl-lower alkyl or $R_5$-phenyl and each of $R_4$, $R_5$, $R_6$ and $R_7$ for hydrogen, lower alkyl, lower alkoxy, halogeno or trifluoromethyl, in which compounds lower alkyl and lower alkoxy contain at most one tertiary carbon atom, and $An^\ominus$ stands for the anion of a therapeutically useful acid.

2. A compound as claimed in claim 1, and having the formula

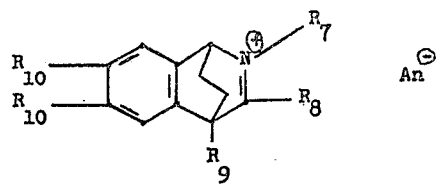

in which $R_7$ stands for methyl, ethyl, n-propyl, n-butyl, allyl, benzyl, 2-phenylethyl or carbethoxy-methyl, $R_8$ for methyl, ethyl, n-propyl or n-butyl, $R_9$ for hydrogen, methyl, ethyl 3-hydroxy-3-methylbutyl, cyclopentyl, cyclohexylmethyl, benzyl, phenyl or 4-fluorophenyl and $R_{10}$ for hydrogen or methoxy, and $An^\ominus$ for the anion of a therapeutically useful acid.

3. A compound as claimed in claim 1 and being the 4 - cyclopentyl - 2,3-dimethyl-1,4-dihydro-1,4-ethano-isoquinolinium chloride.

4. A compound as claimed in claim 1, and being a 2,3 - di - lower alkyl-4-phenyl-1,4-dihydro-1,4-ethano-isoquinolinium halide.

5. A compound as claimed in claim 1 and being a 2-lower alkyl - 3-methyl-4-phenyl-1,4-dihydro-1,4-ethano-isoquinolinium halide.

6. A compound as claimed in claim 1 and being a 2,3-dimethyl - 4 - phenyl-1,4-dihydro-1,4-ethano-isoquinolinium halide.

7. A compound as claimed in claim 1 and being the 2,3 - dimethyl - 4-phenyl - 1,4-dihydro-1,4-ethano-isoquinolinium chloride.

8. A compound as claimed in claim 1 and being the 2-ethyl - 3 - methyl - 4-phenyl-1,4-dihydro-1,4-ethano-isoquinolinium iodide.

9. A compound as claimed in claim 1 and being the 2 - benzyl - 3 - methyl-4-phenyl-1,4-dihydro-1,4-ethano-isoquinolinium chloride.

10. A compound as claimed in claim 1 and being the 2,3,4 - trimethyl - 1,4-dihydro-1,4-ethano-isoquinolinium iodide.

11. A compound as claimed in claim 1 and being the 2-benzyl - 3,4 - dimethyl - 1,4-dihydro-1,4-ethano-isoquinolinium bromide.

12. A compound as claimed in claim 1 and being the 2,3 - dimethyl - 1,4 - dihydro-1,4-ethano-isoquinolinium iodide.

13. A compound as claimed in claim 1 and being the 4 - cyclohexylmethyl - 2,3-dimethyl-1,4-dihydro-1,4-ethano-isoquinolinium chloride.

14. A compound as claimed in claim 1 and being the 2,3 - dimethyl - 4-(4-fluoro-phenyl)-1,4-dihydro-1,4-ethano-isoquinolinium iodide.

15. A compound as claimed in claim 1 and being the 2 - benzyl - 3 - methyl-1,4-dihydro-1,4-ethano-isoquinolinium iodide.

16. A compound as claimed in claim 1 and being the 2,3 - dimethyl - 4 - ethyl - 1,4-dihydro-1,4-ethano-isoquinolinium iodide.

17. A compound as claimed in claim 1 and being the 4 - benzyl - 2,3 - dimethyl-1,4-dihydro-1,4-ethano-isoquinolinium iodide.

No references cited.

NICHOLAS S. RIZZO, *Primary Examiner.*

D. DAUS, *Assistant Examiner.*